Nov. 29, 1966  A. BORSUK ETAL  3,287,761
SKINLESS SAUSAGE MAKING MACHINE
Original Filed Sept. 26, 1963  28 Sheets-Sheet 25
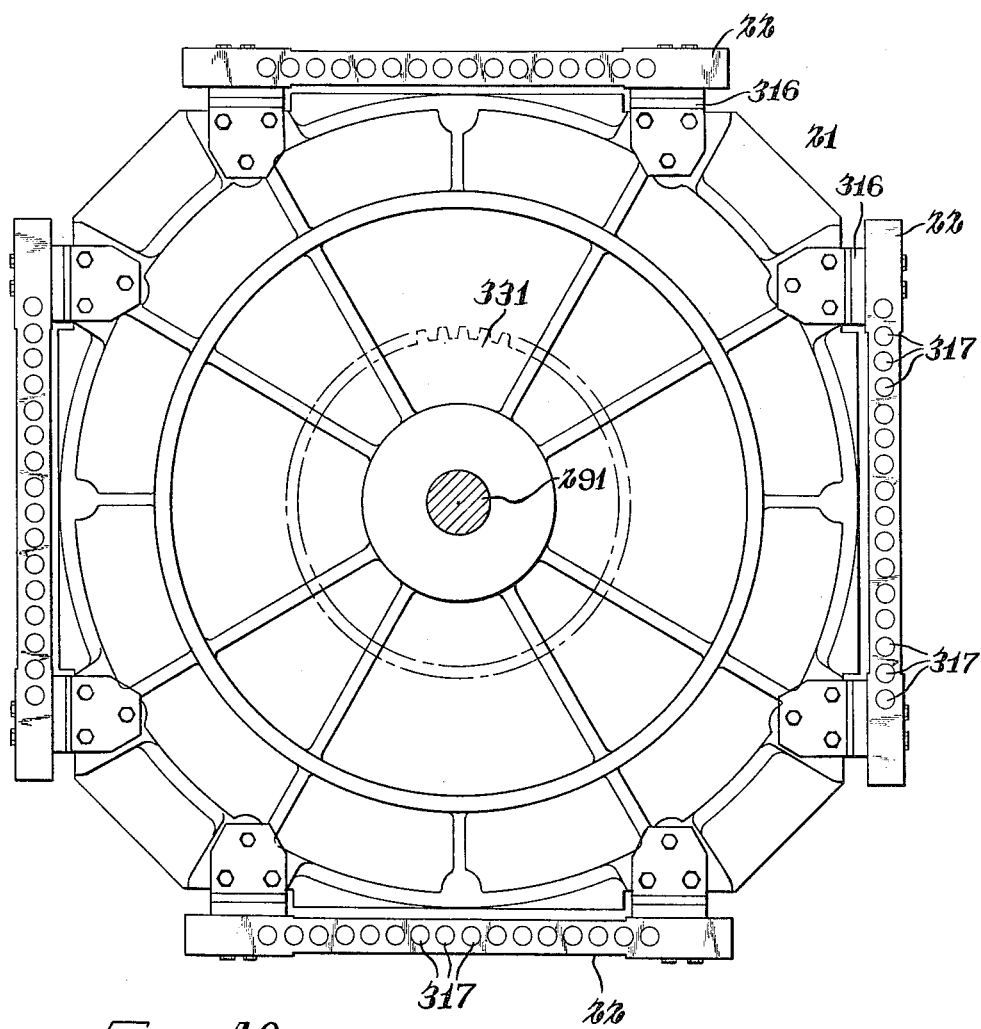
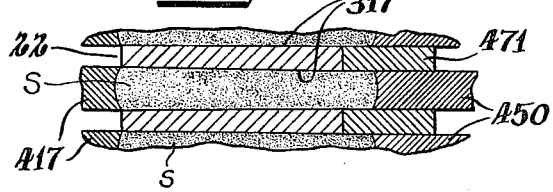
INVENTORS
ALVIN BORSUK
WILLIAM R. KOHRS
RICHARD J. MILLENAAR
WILLIAM J. HIGGINS
BY
Greist, Lockwood, Greenawalt & Dewey
Attys.

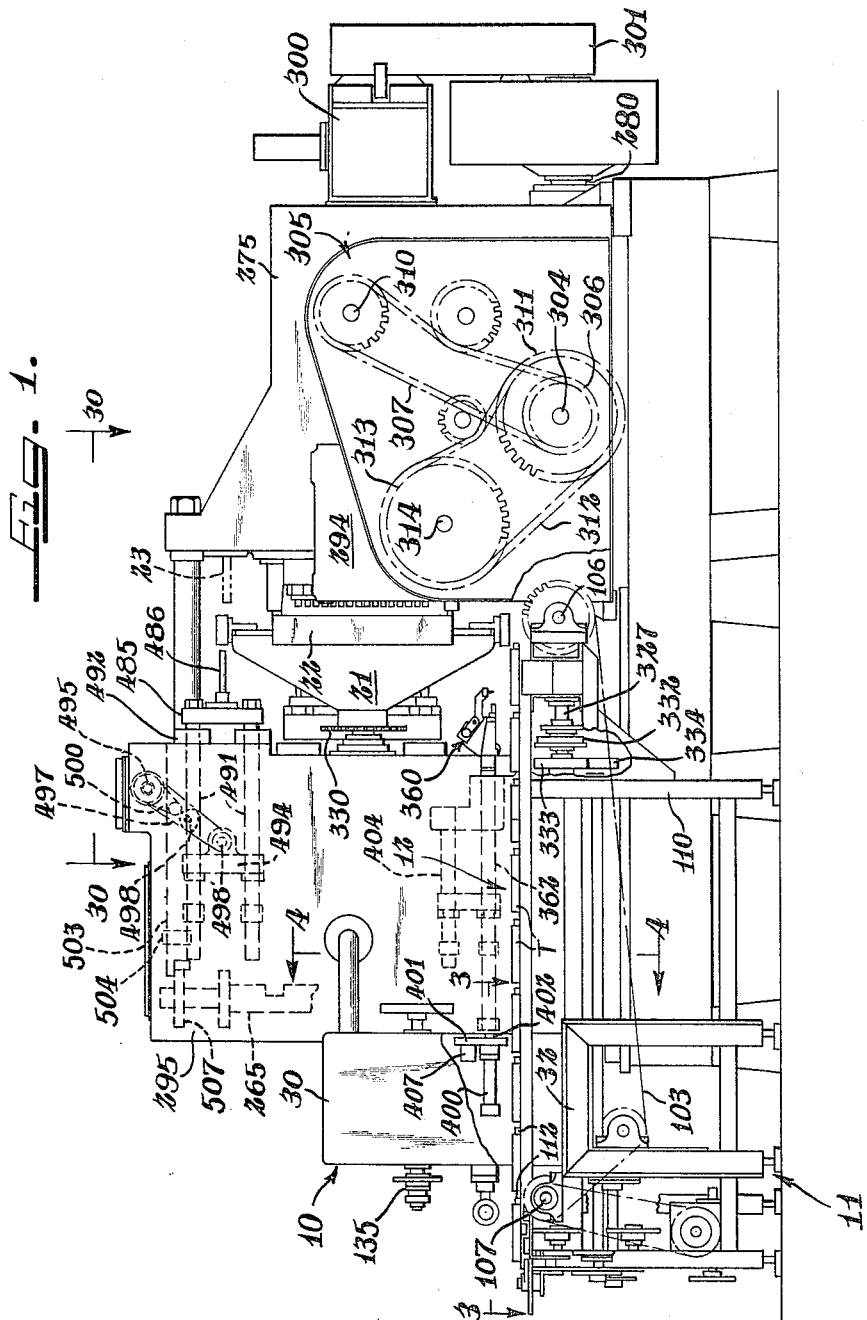

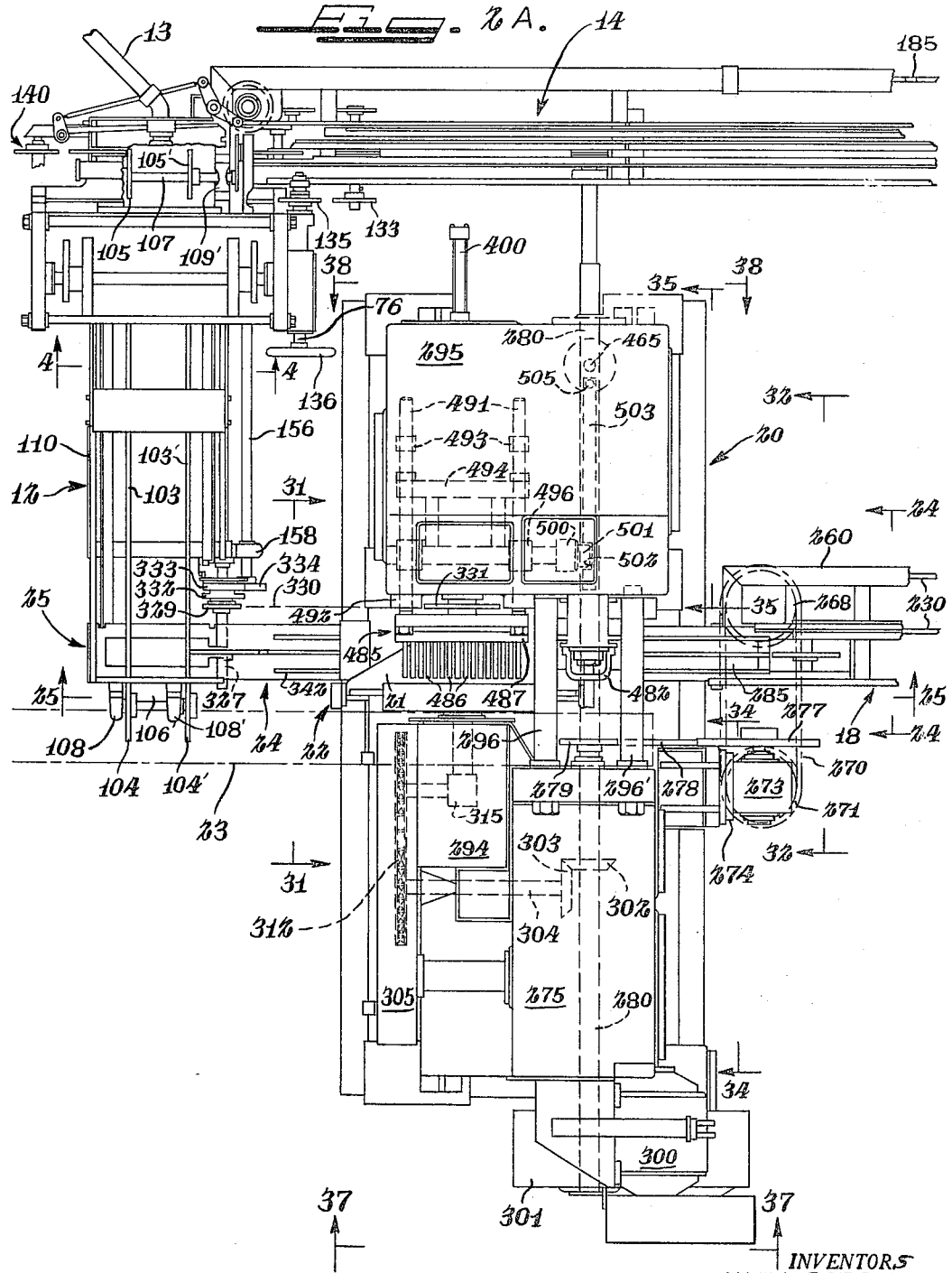

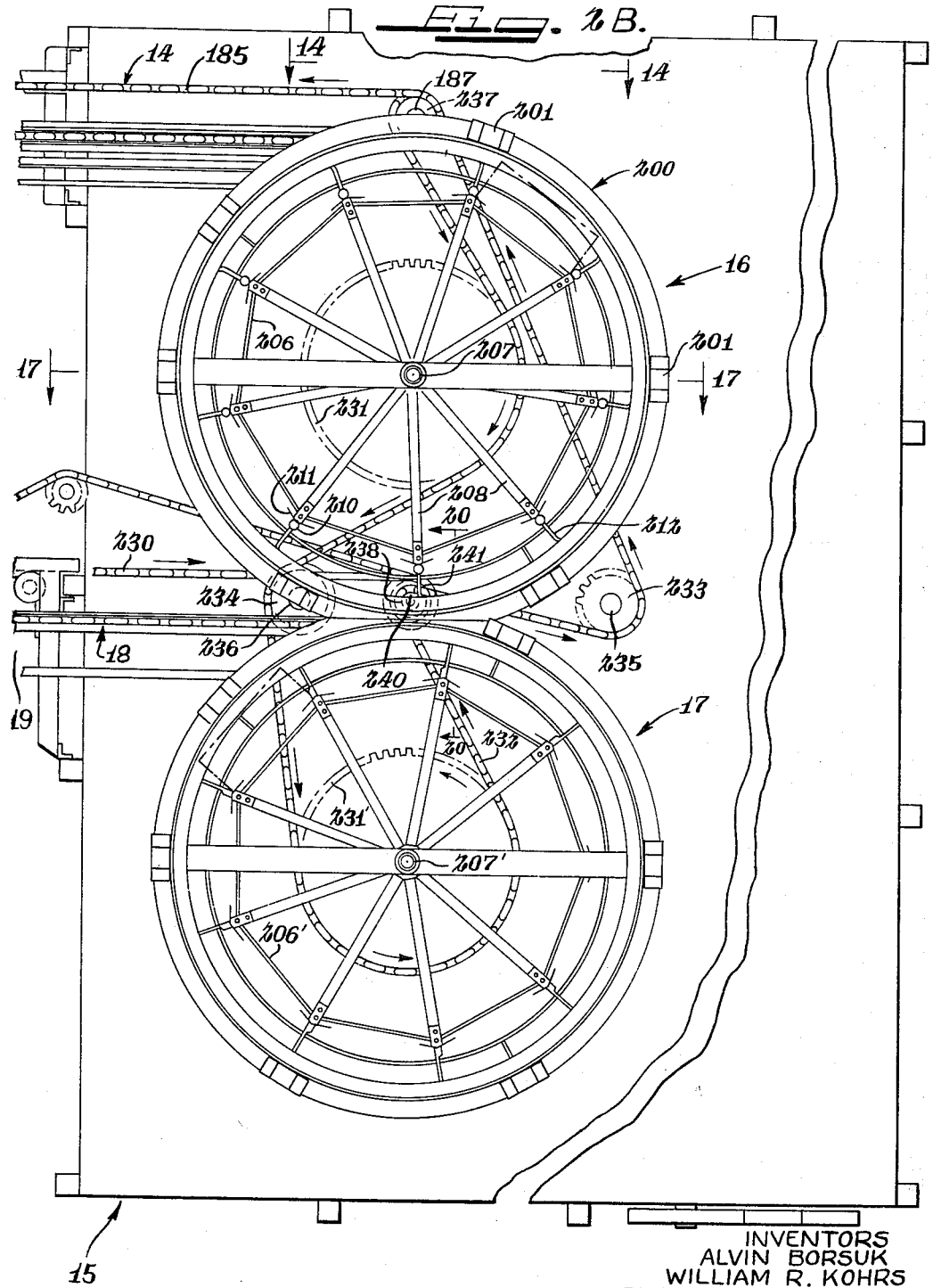

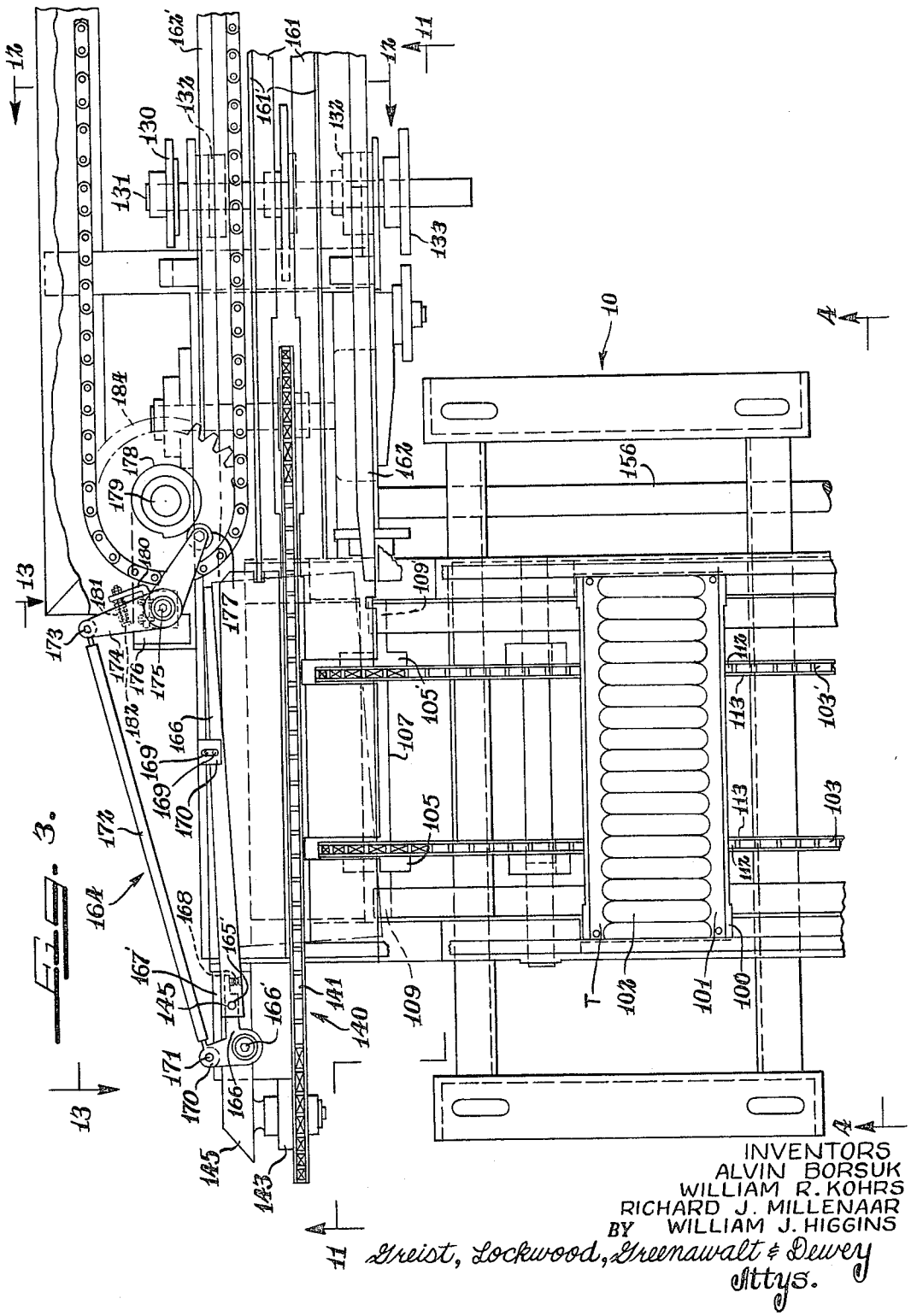

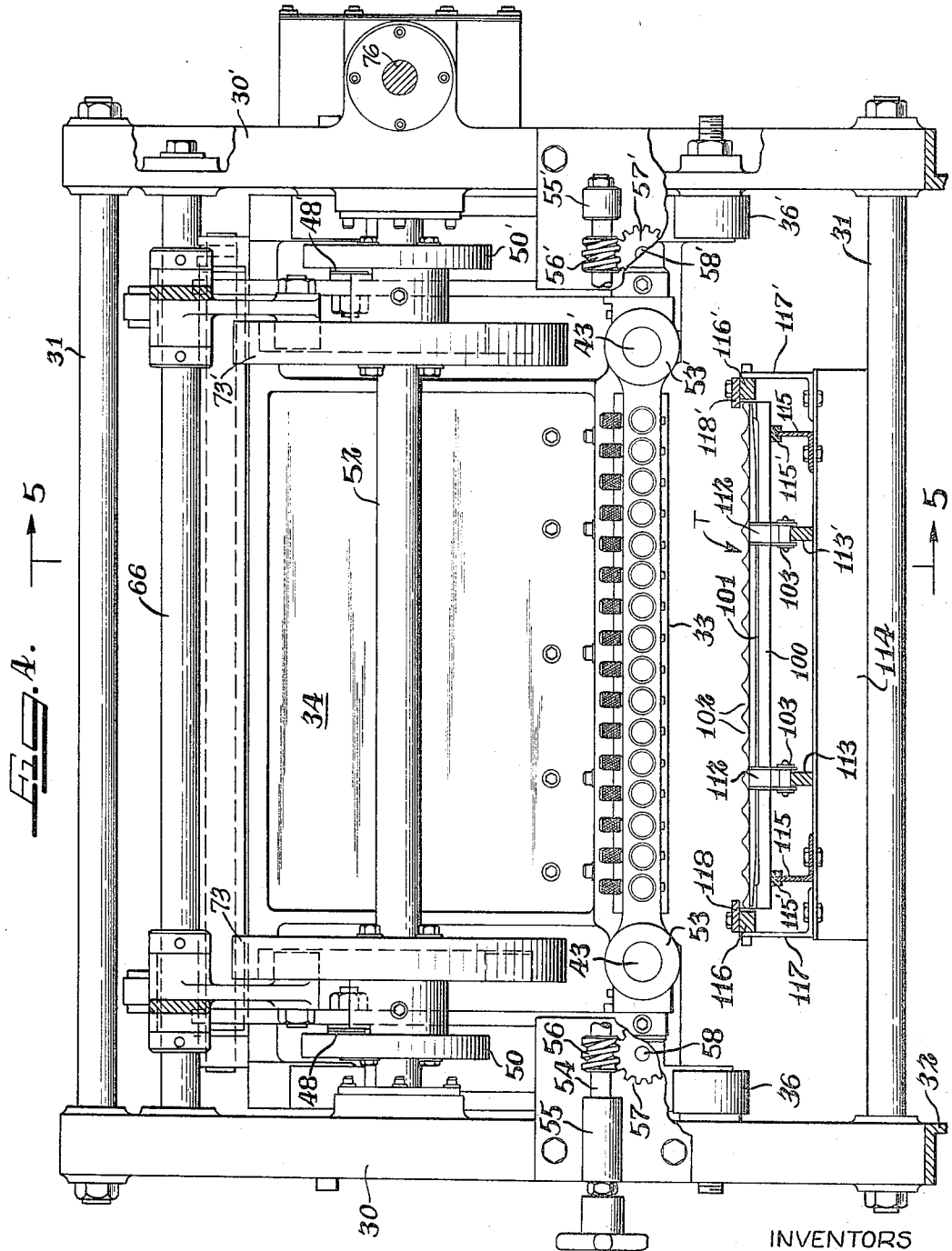

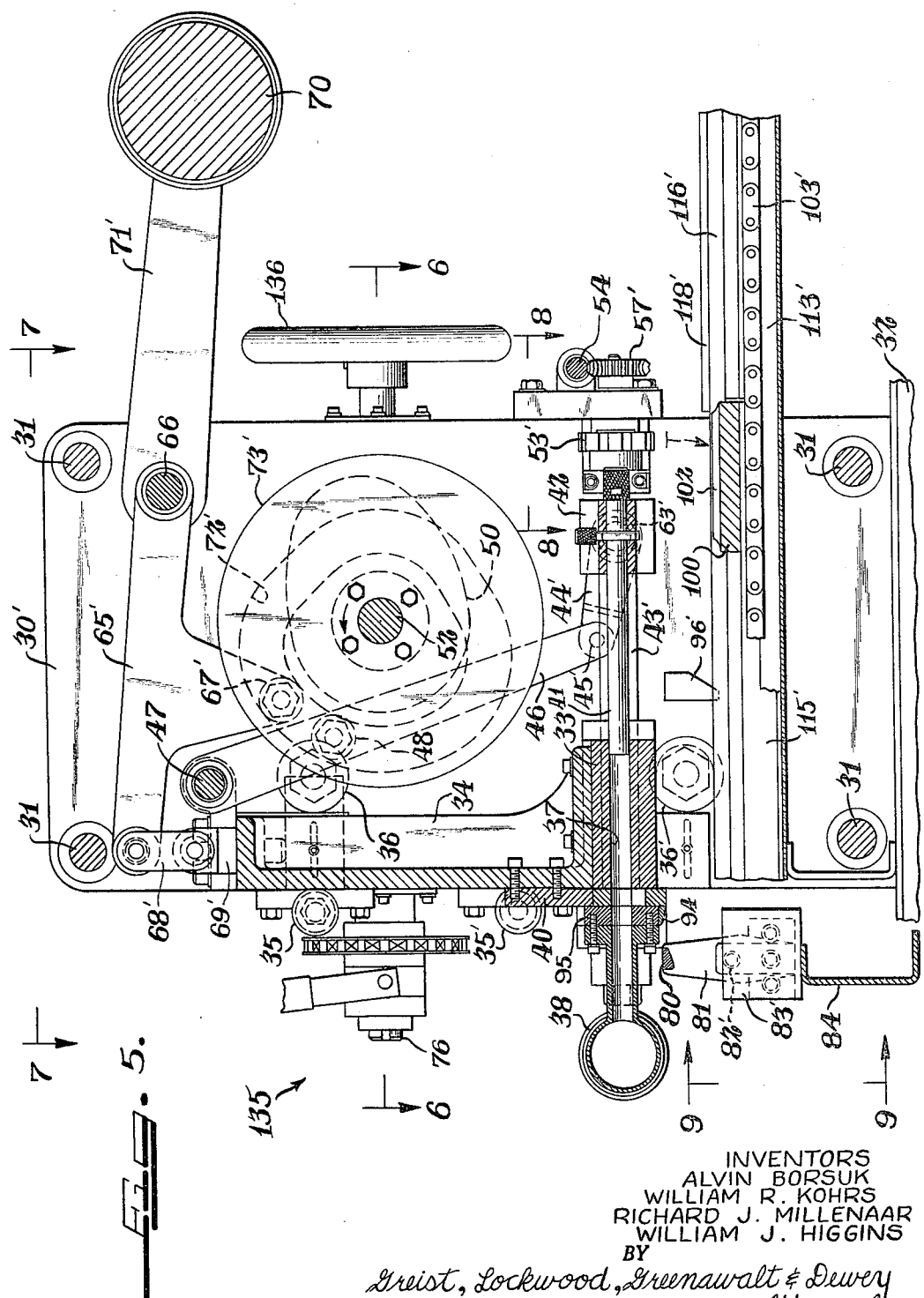

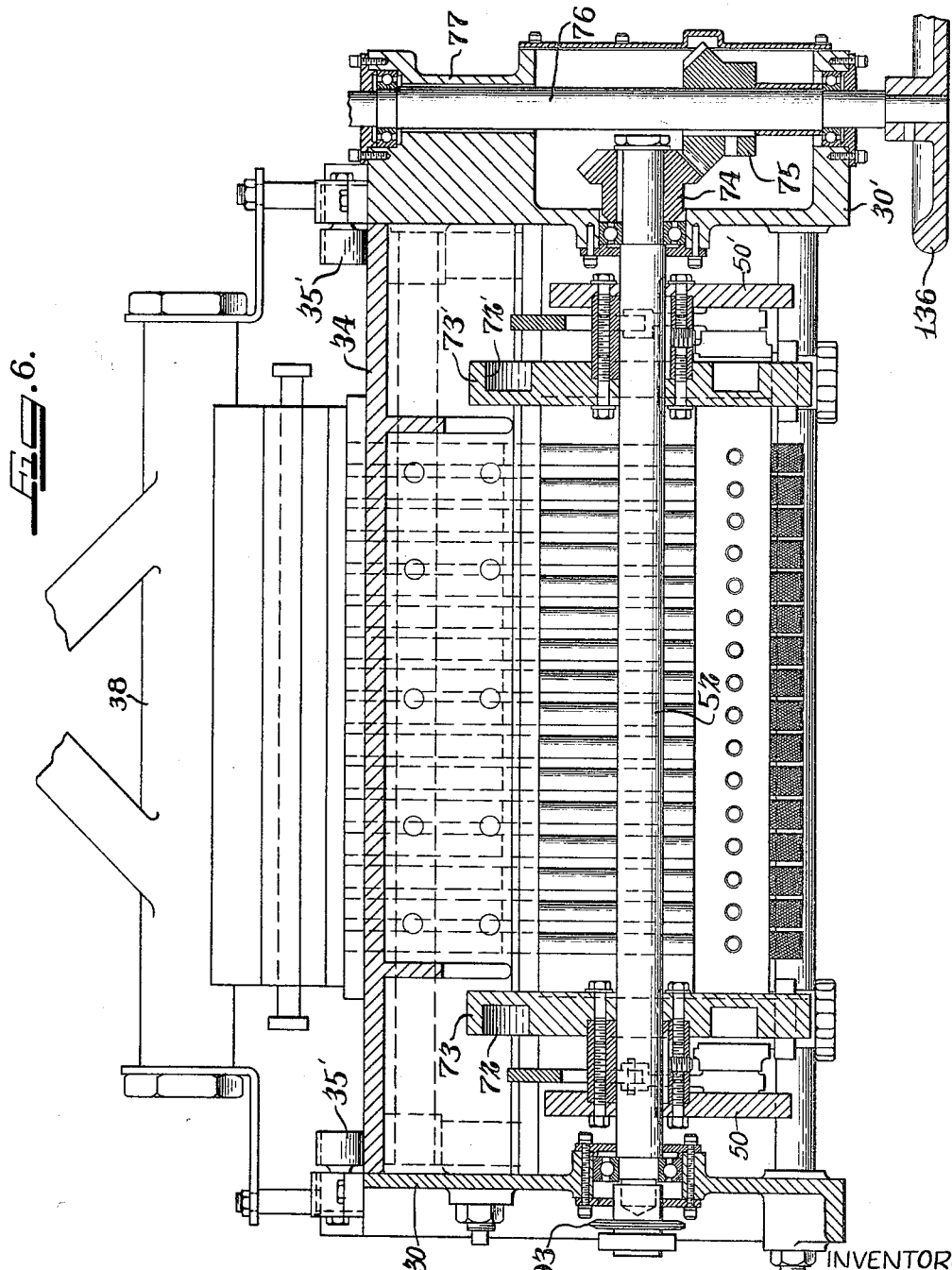

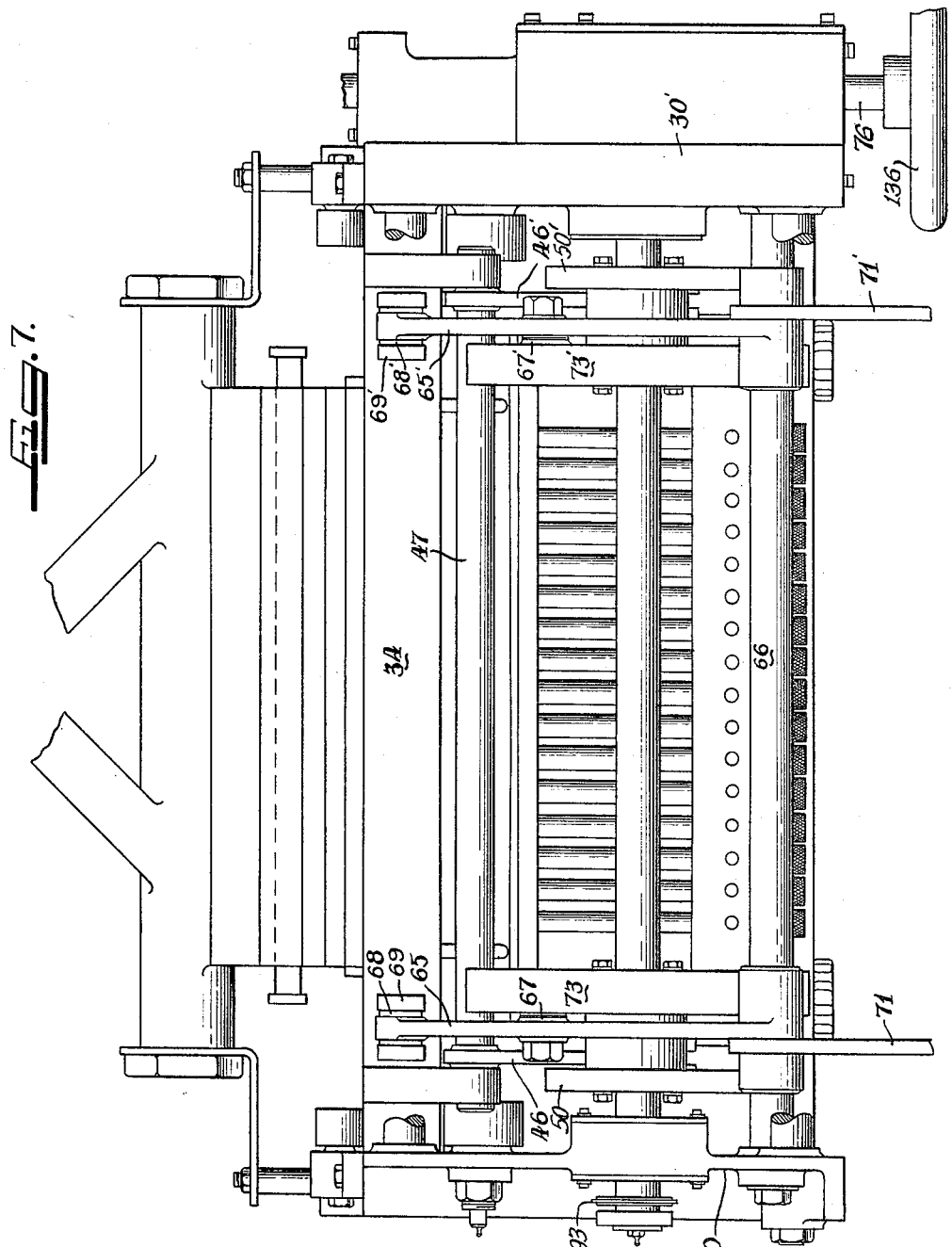

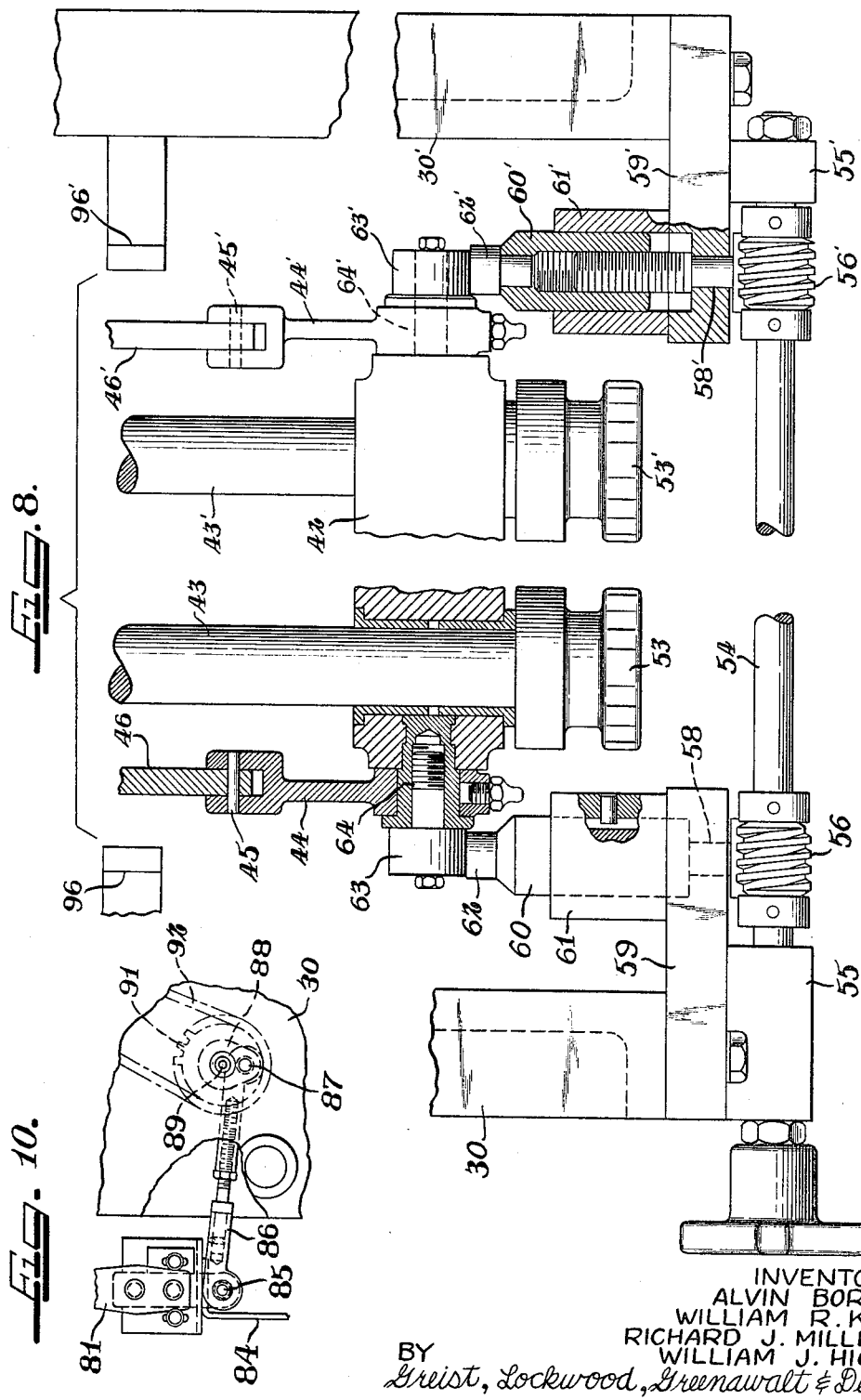

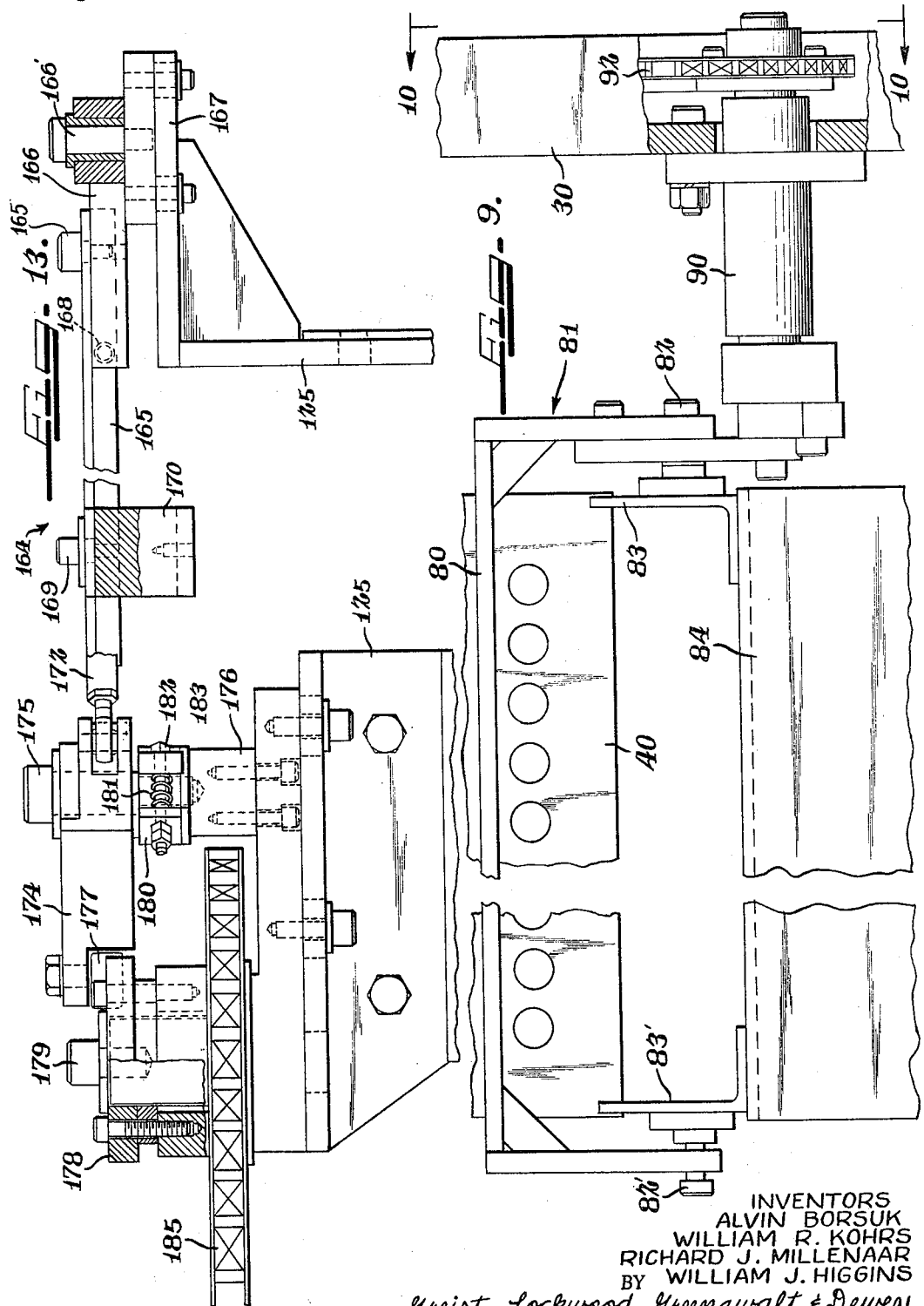

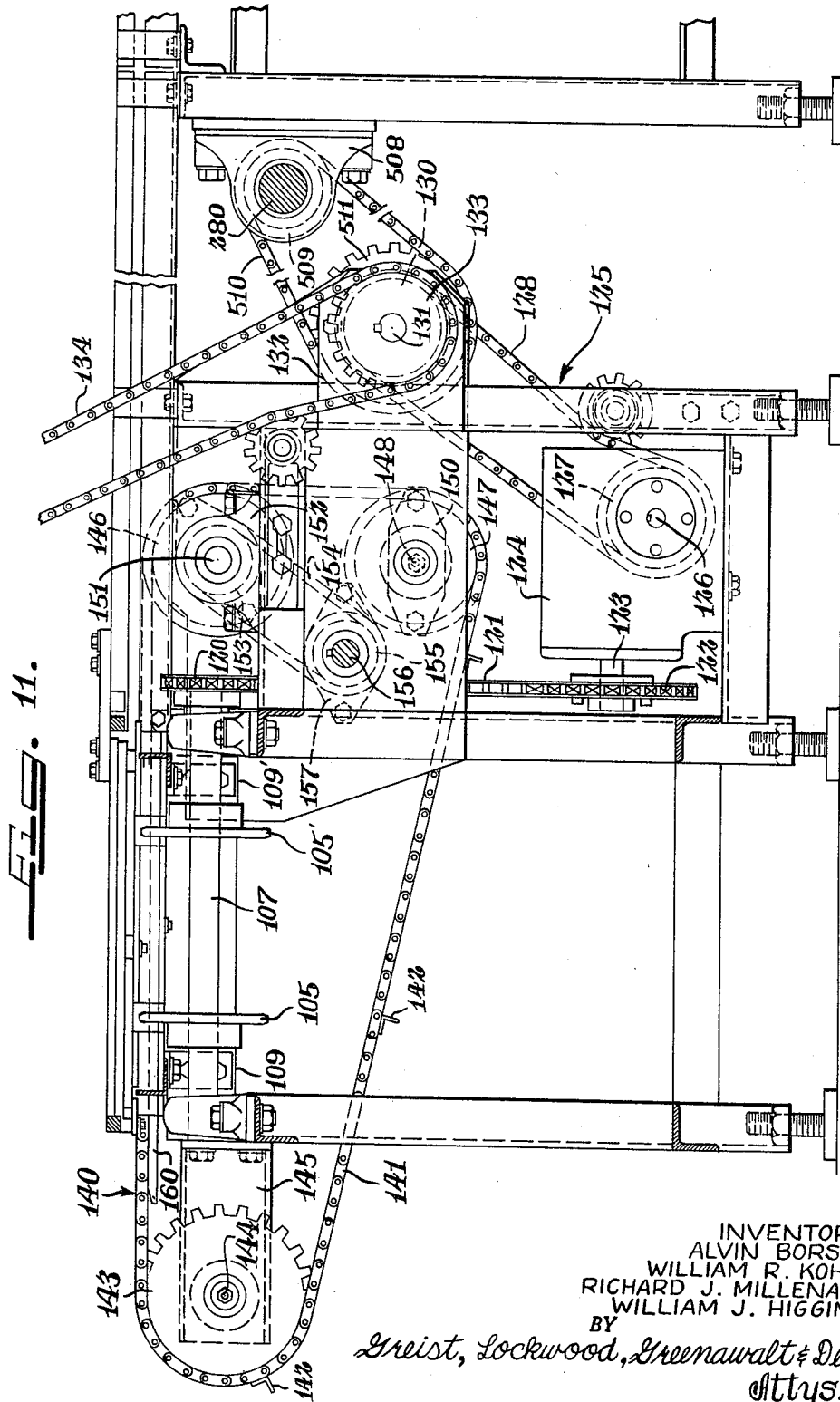

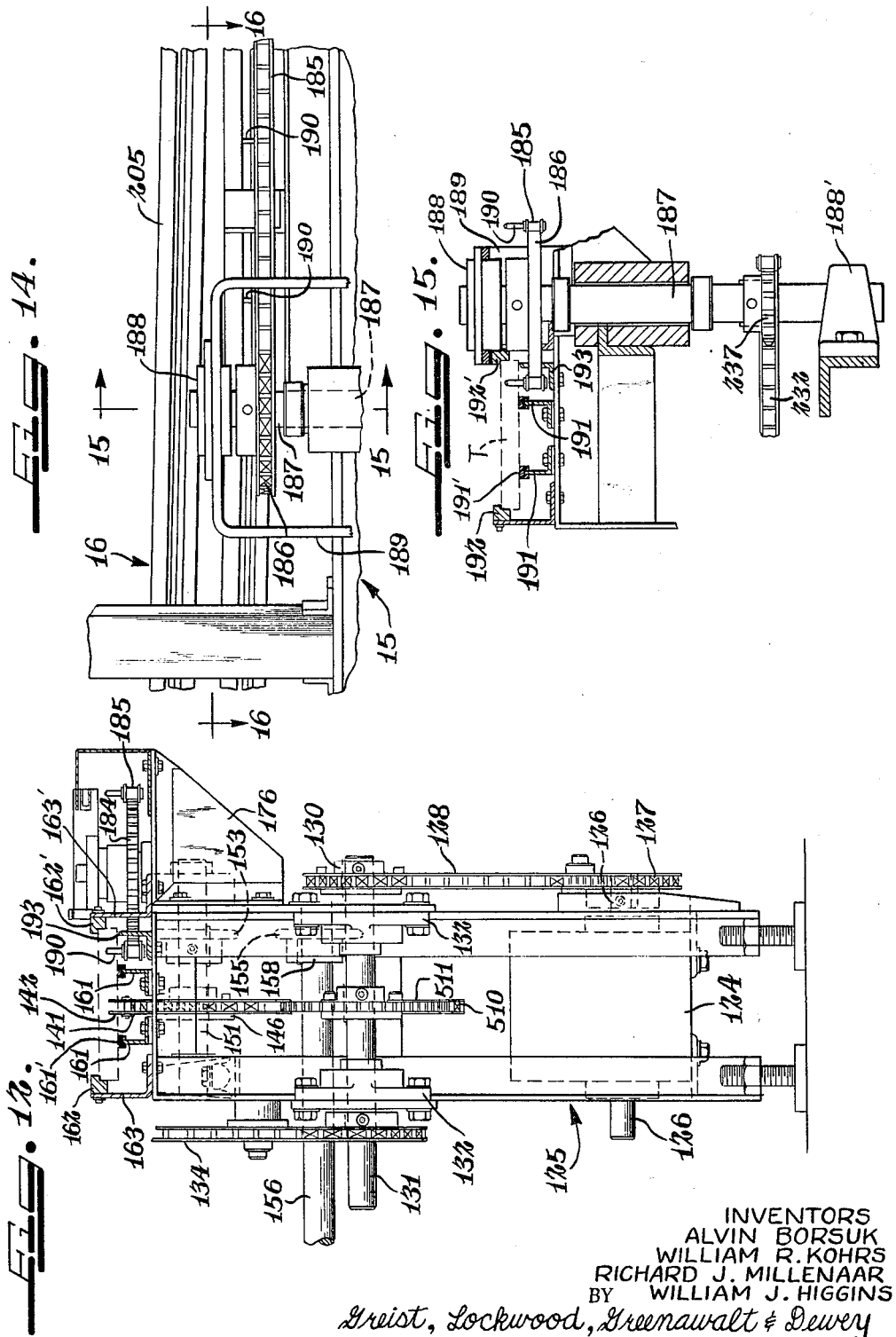

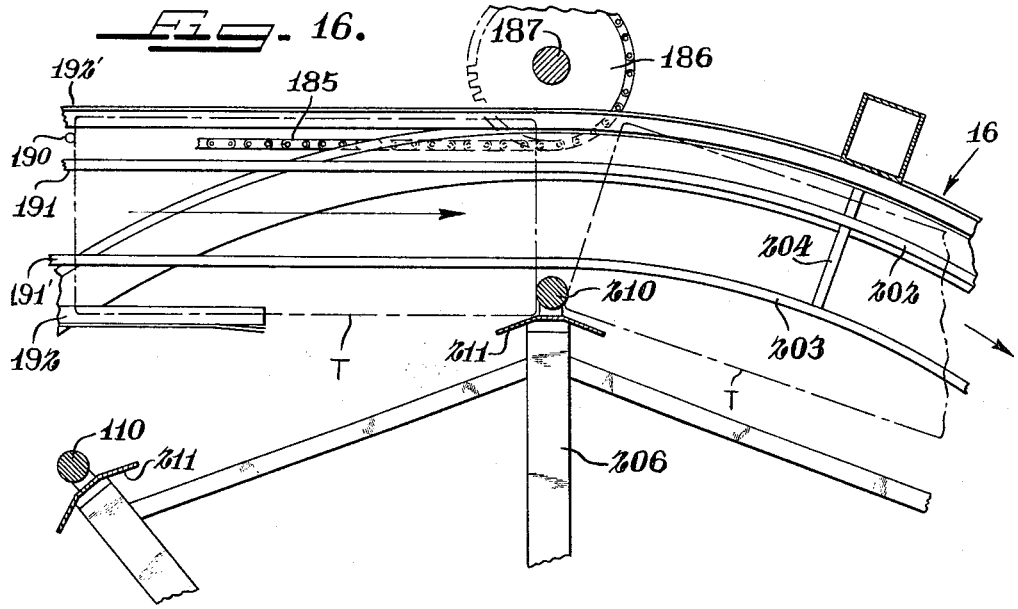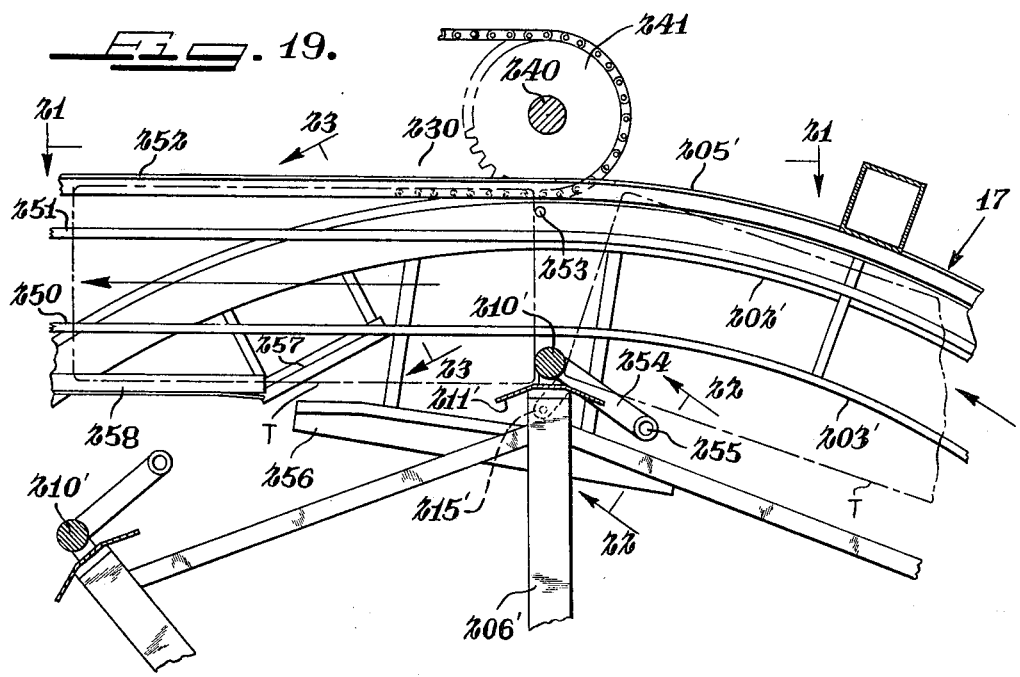

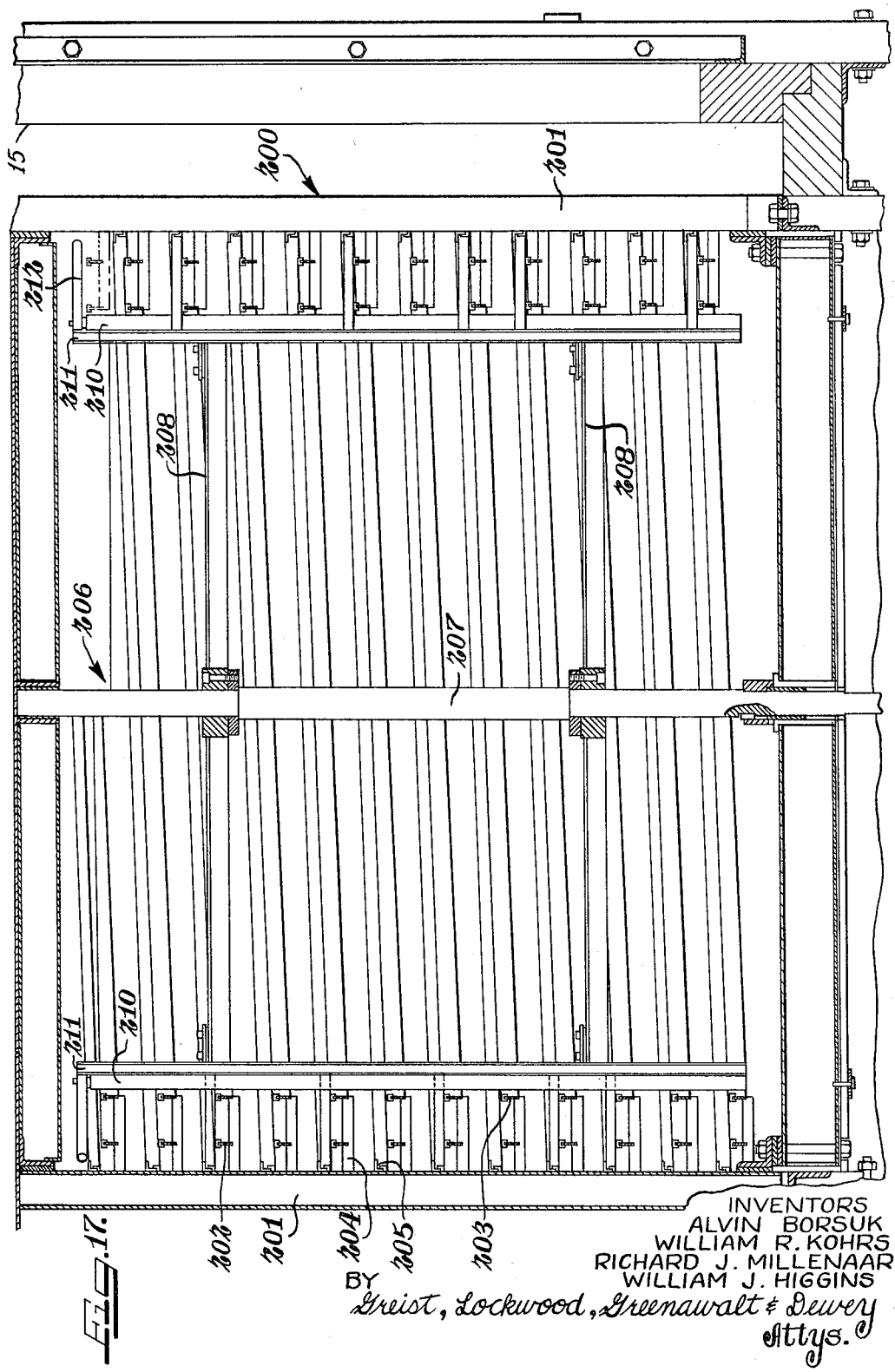

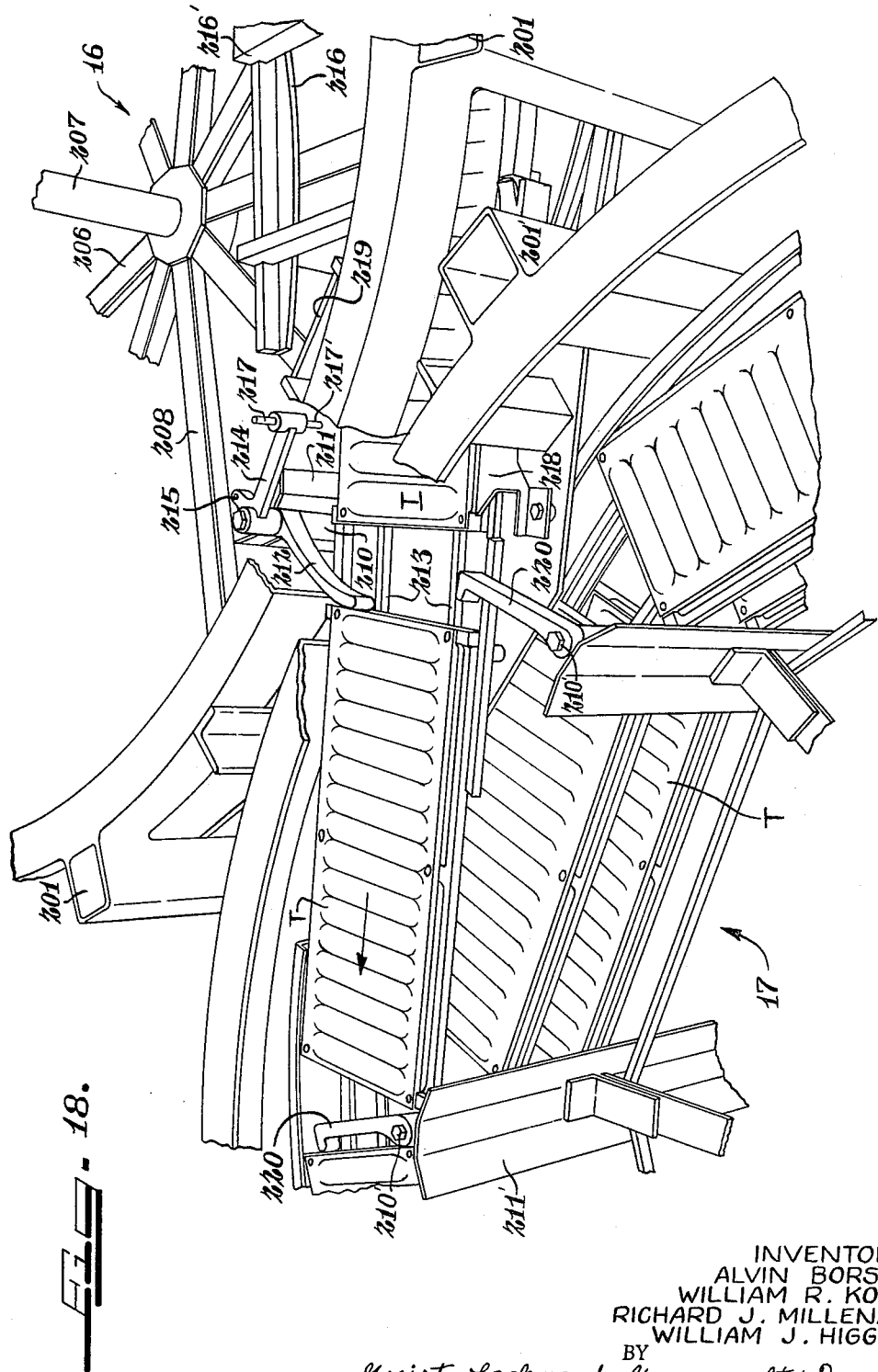

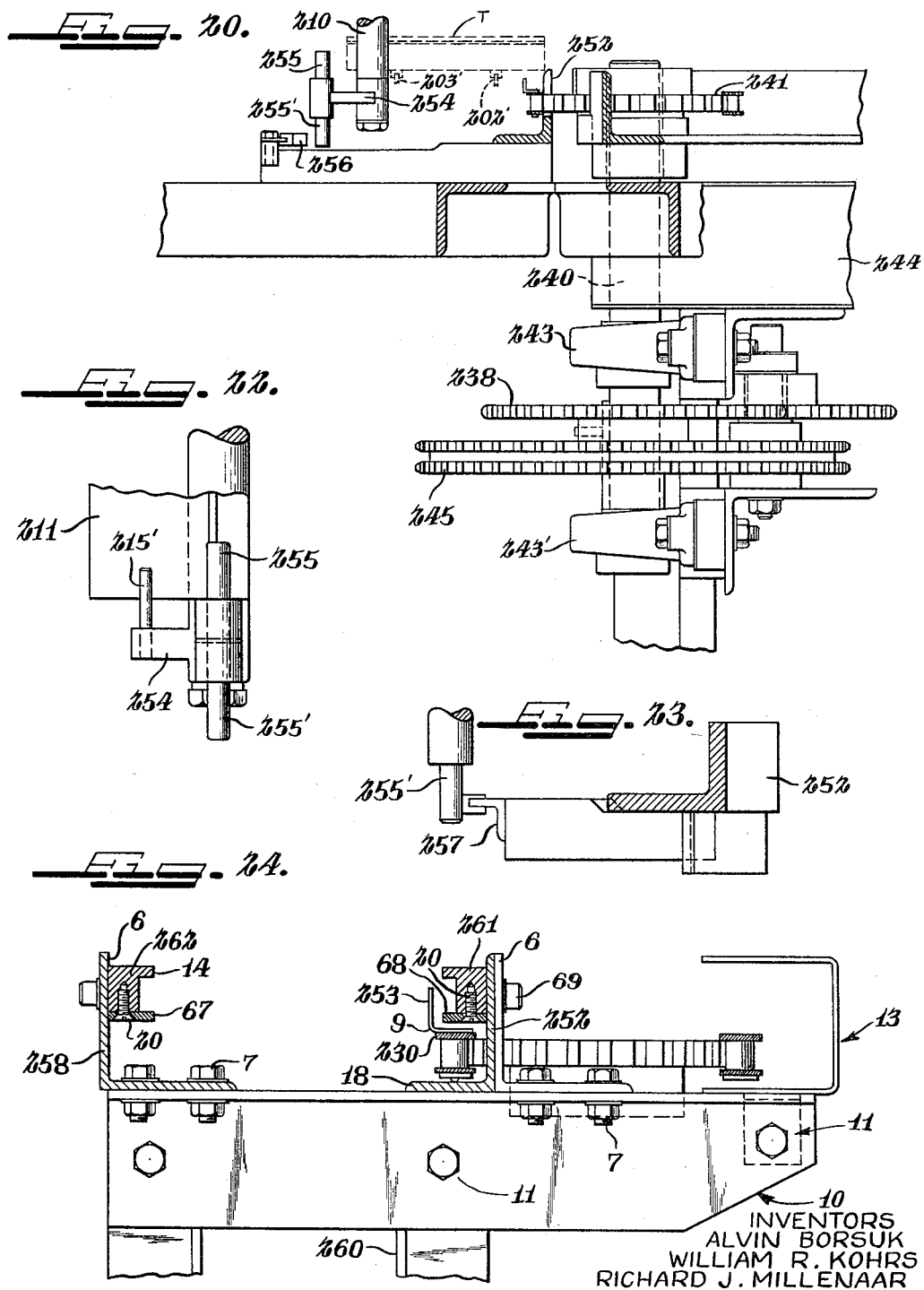

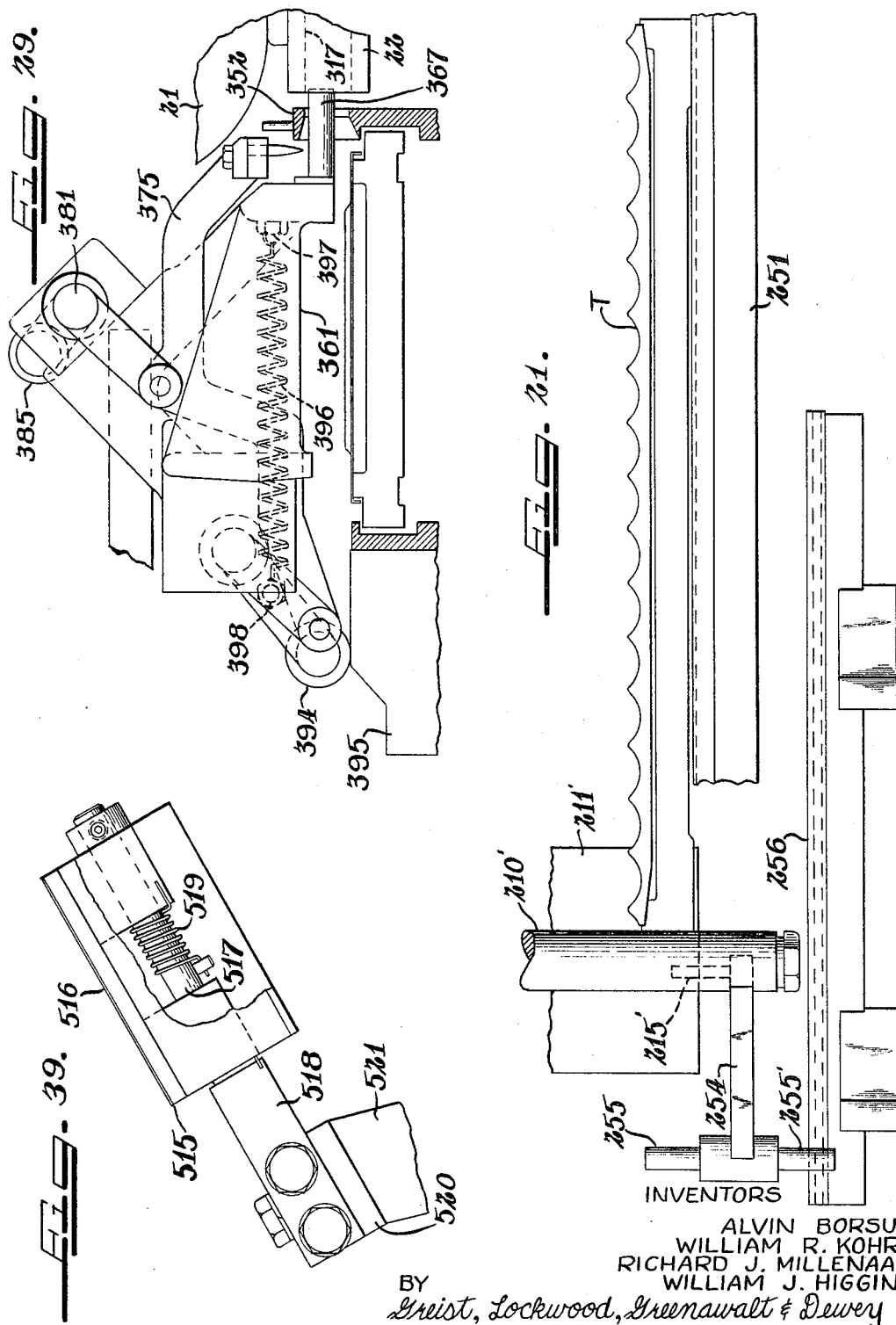

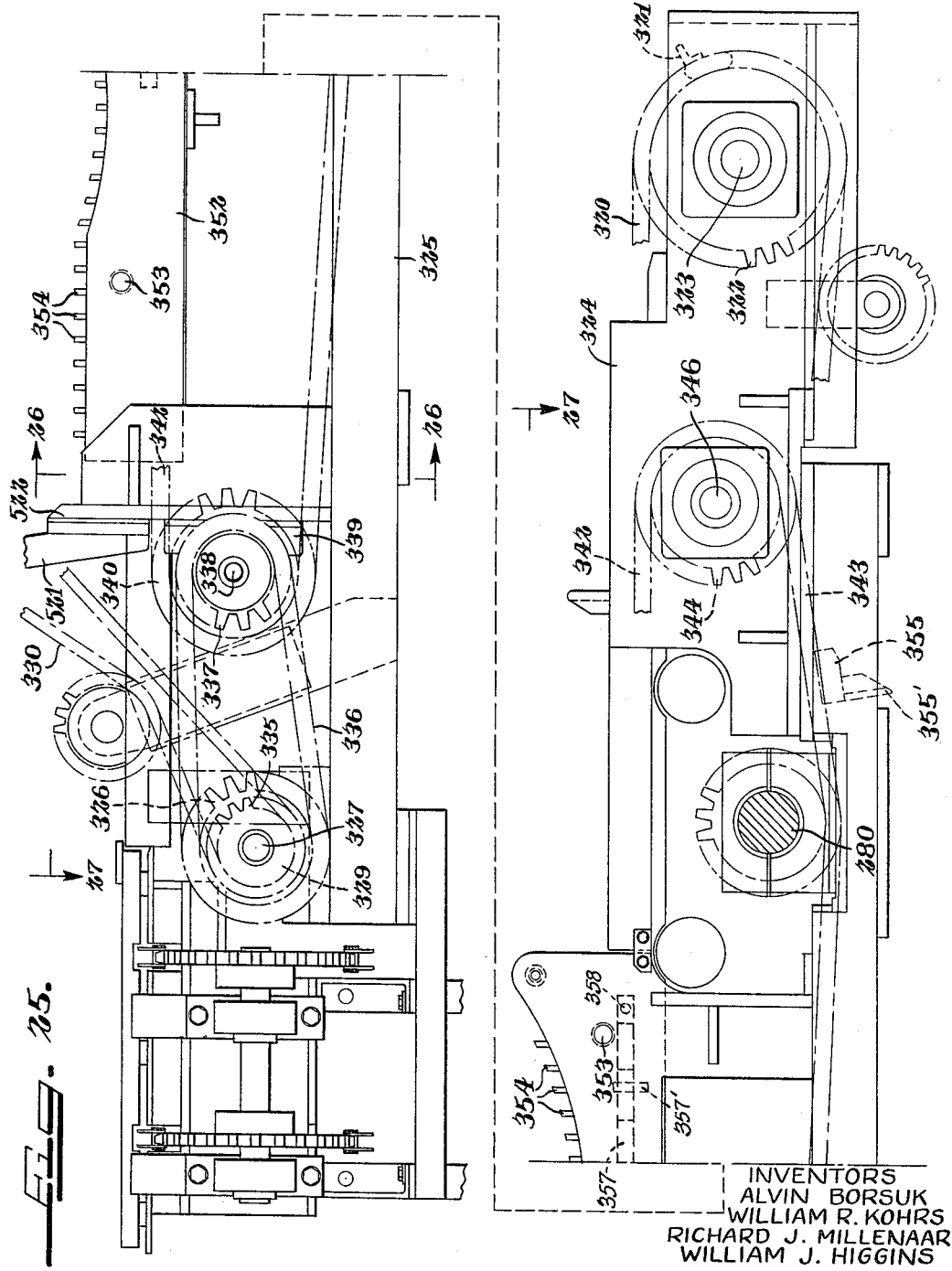

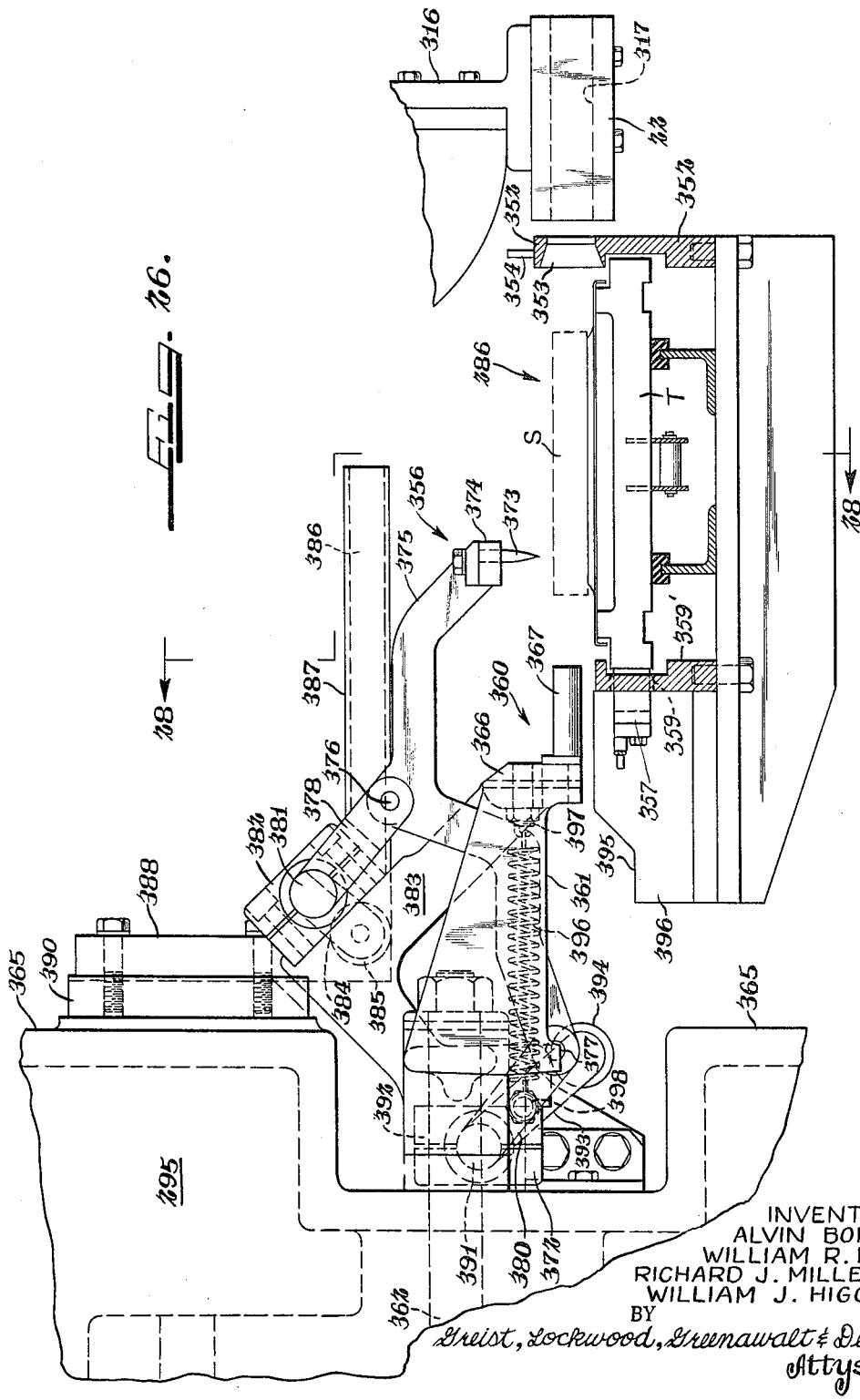

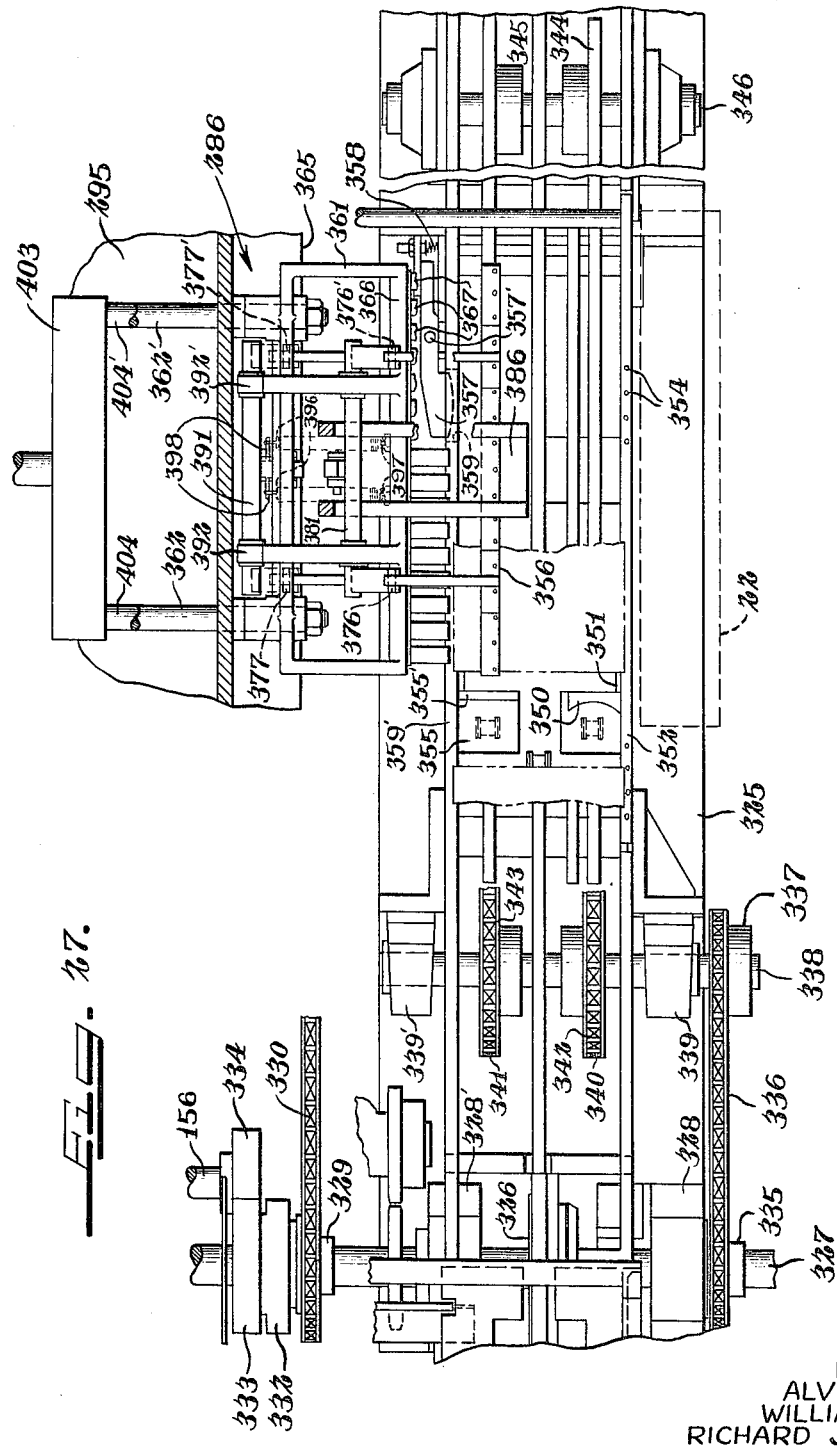

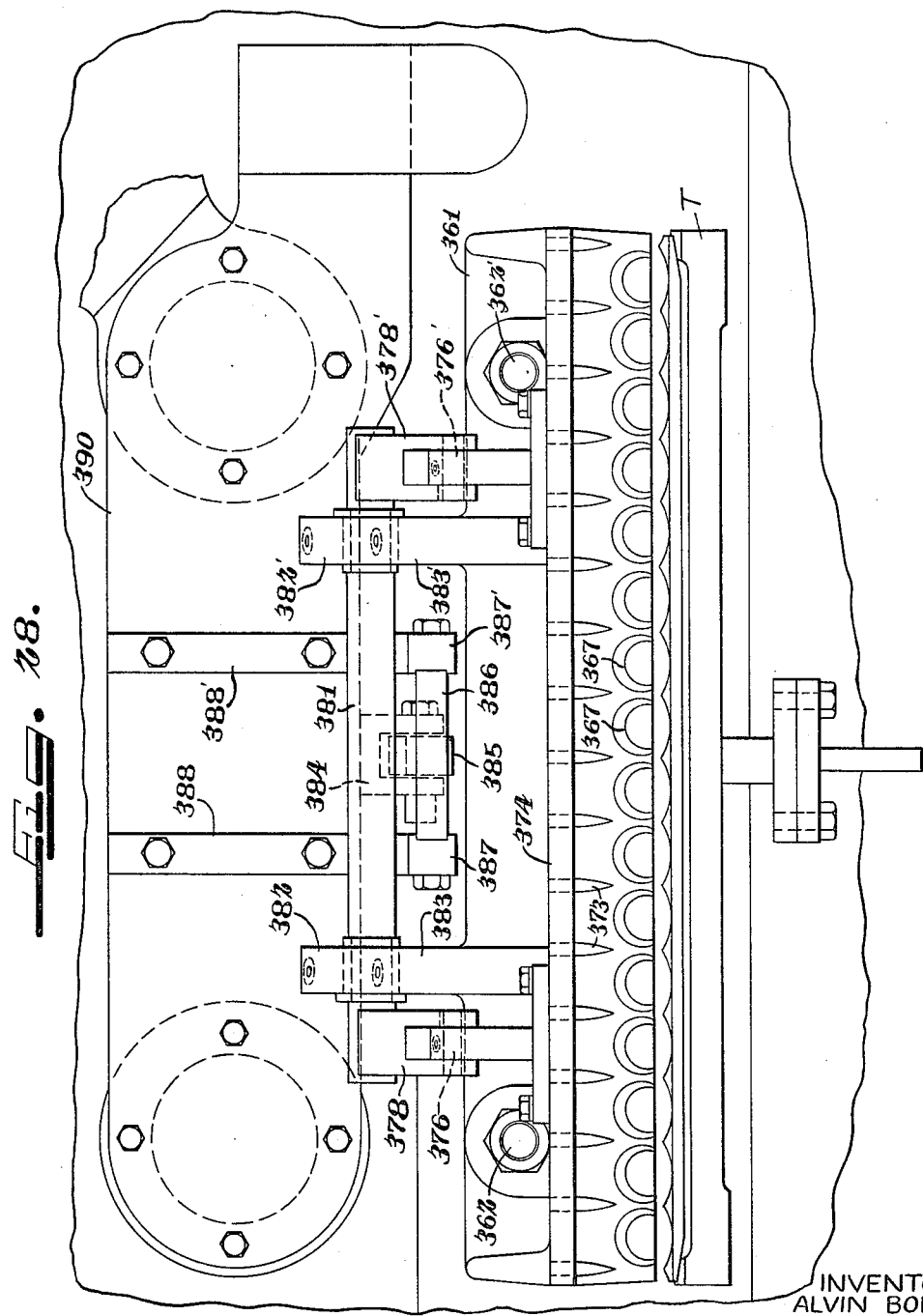

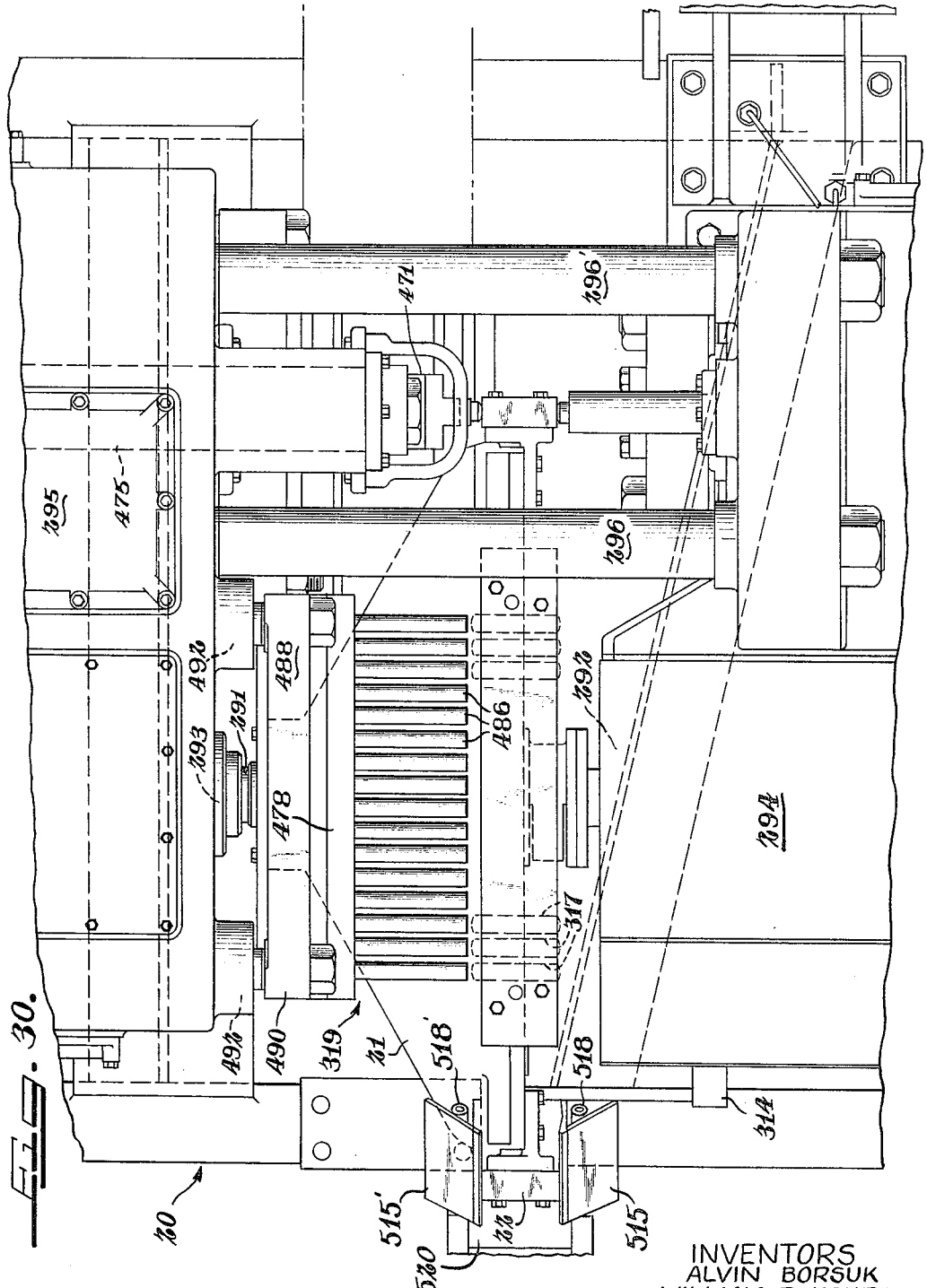

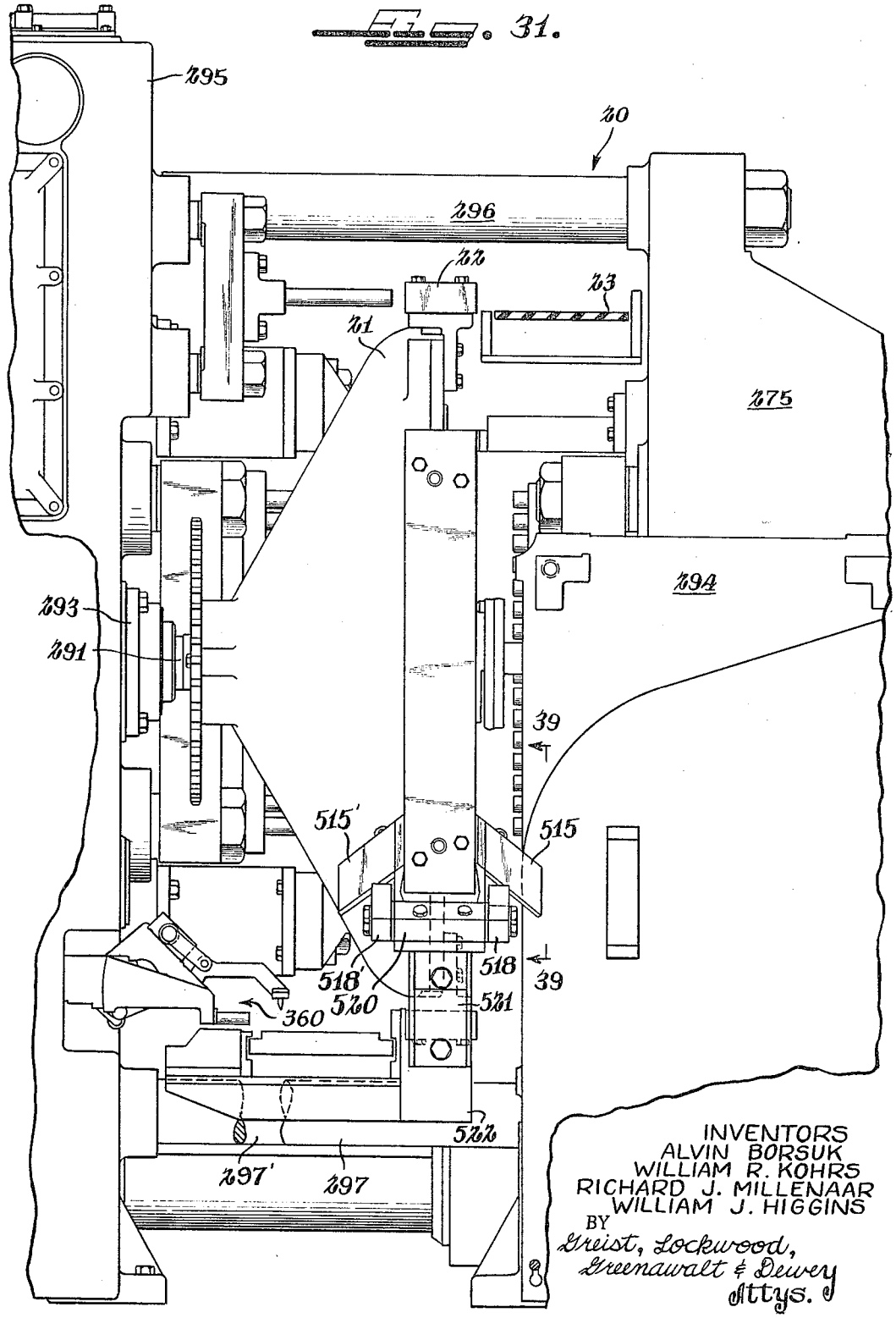

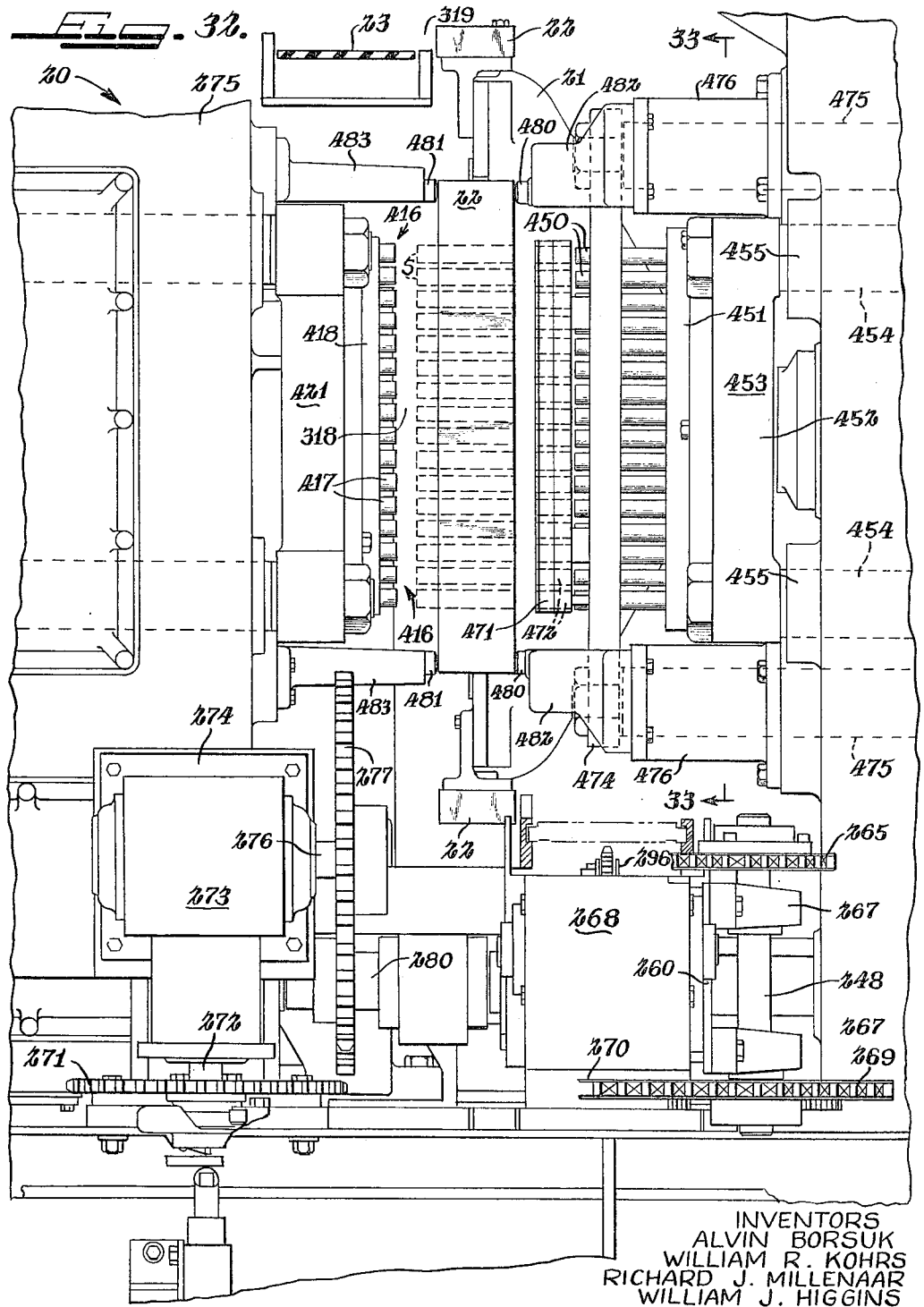

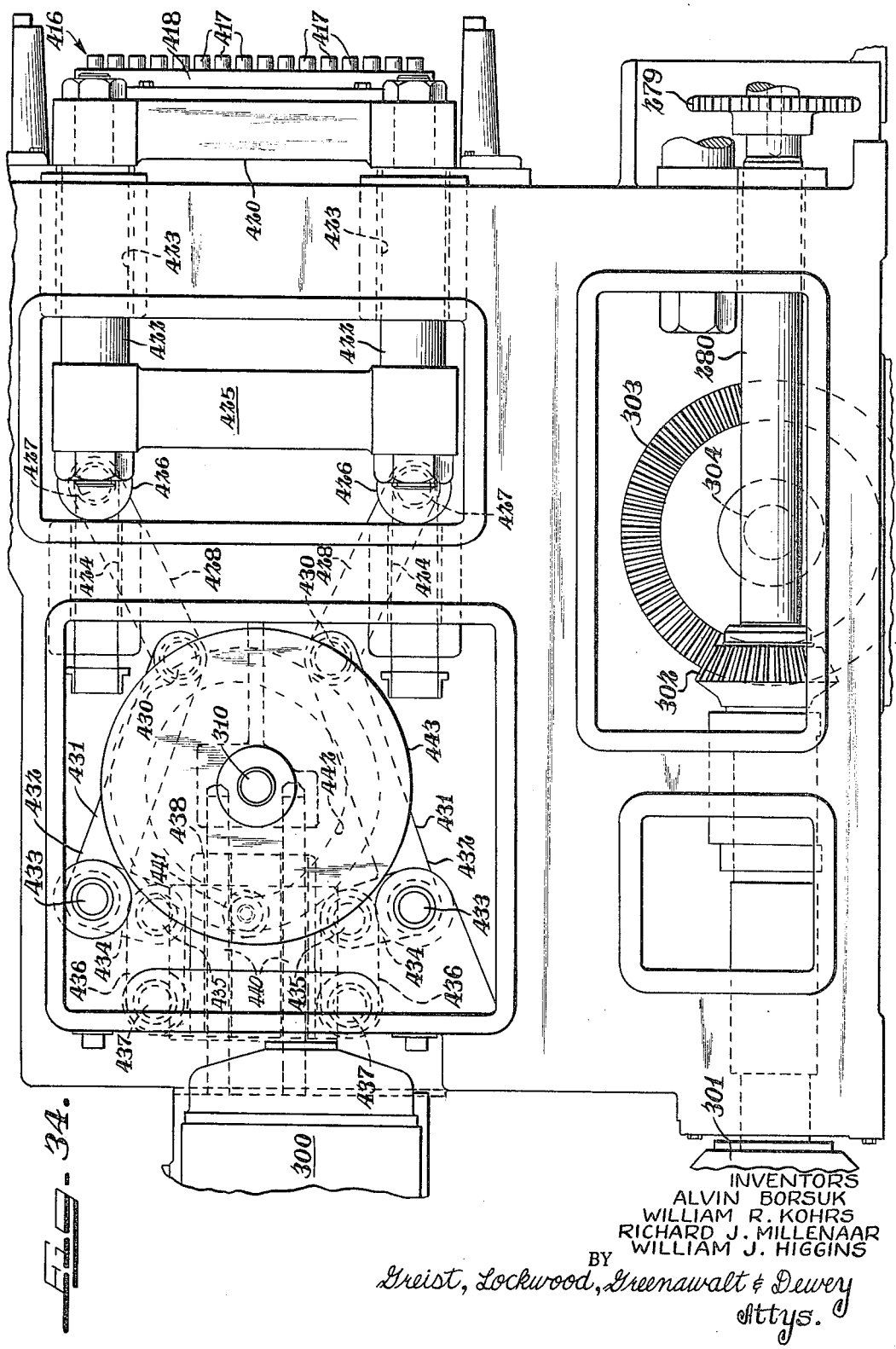

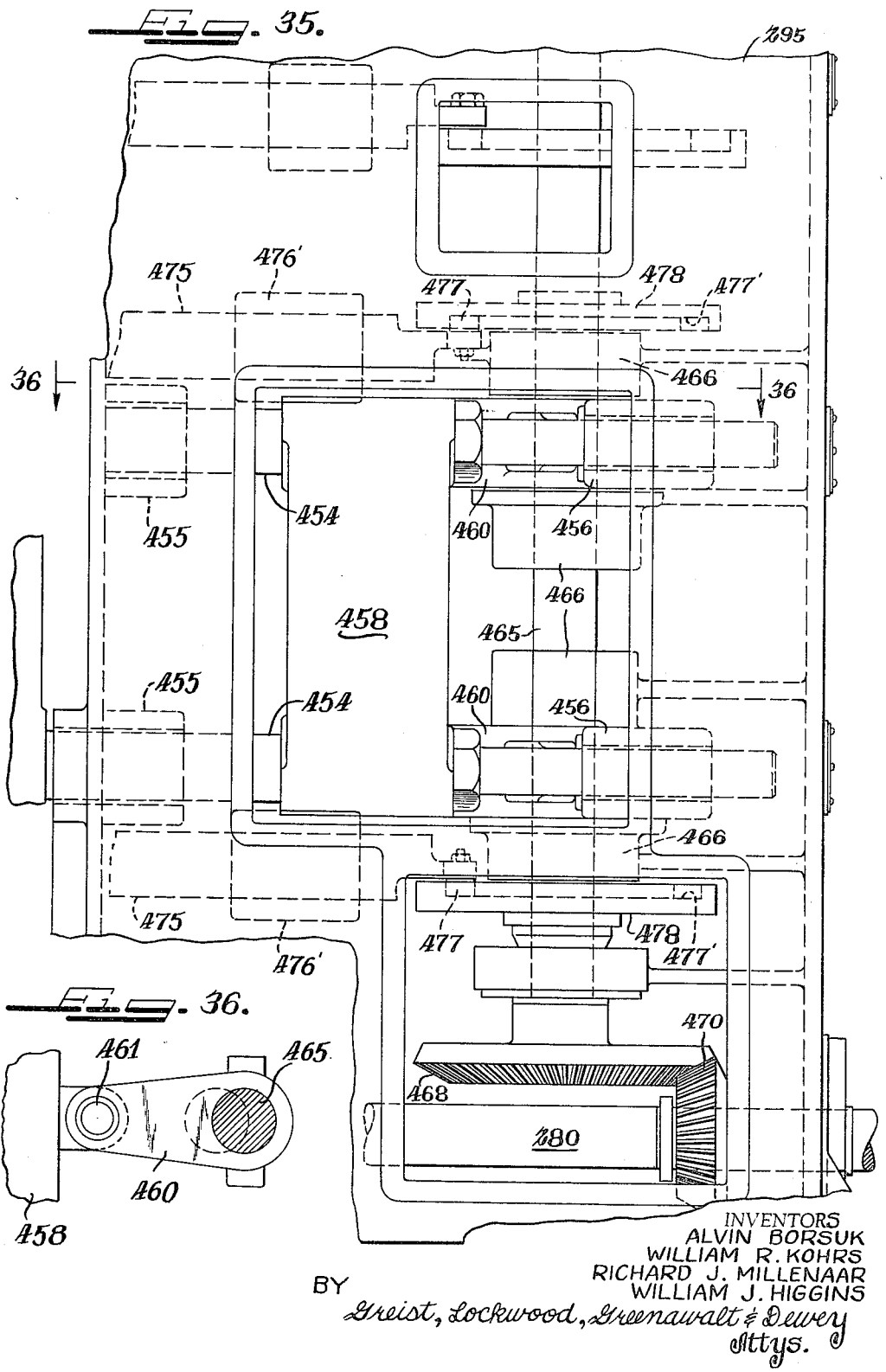

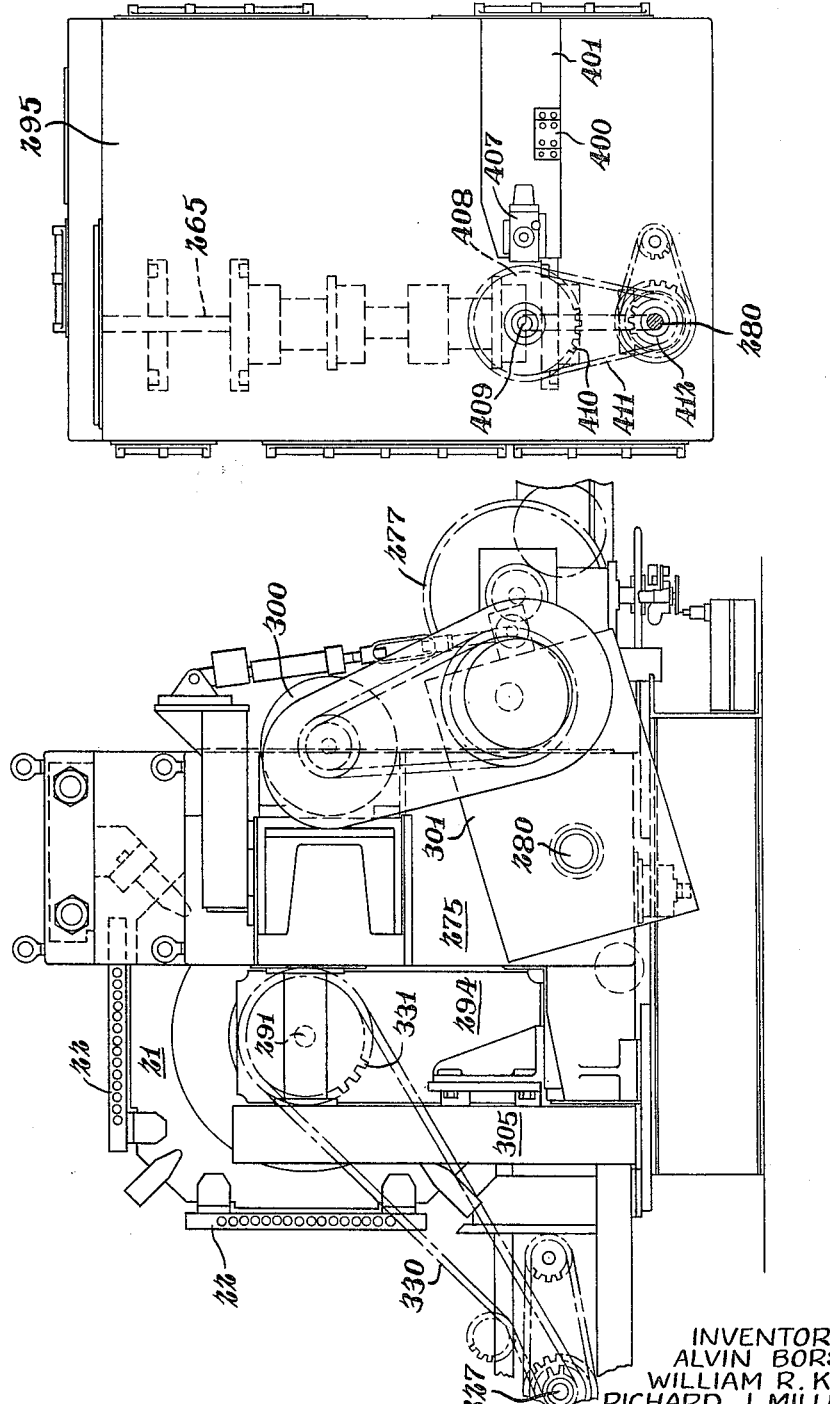

United States Patent Office 3,287,761
Patented Nov. 29, 1966

3,287,761
SKINLESS SAUSAGE MAKING MACHINE
Alvin Borsuk and William R. Kohrs, Madison, Wis., and Richard J. Millenaar, Charlottesville, Va., and William J. Higgins, Albuquerque, N. Mex., assignors to Oscar Mayer & Co., Inc., Chicago, Ill., a corporation of Illinois
Continuation of application Ser. No. 311,803, Sept. 26, 1963. This application June 17, 1965, Ser. No. 469,044
23 Claims. (Cl. 17—32)

This application is a continuation of application Serial No. 311,803, filed September 26, 1963, now abandoned.

This invention relates to the preparation of comminuted meat products and is more particularly concerned with improvements in apparatus for initially forming, freezing and subesquently shaping uncooked, skinless sausage-type products to provide the same with a standard cylindrical sausage shape.

Uncooked sausage products in the form of separate links have long been commercially available. Generally, the product is encased in a natural or synthetic casing material which is relatively tough but fully edible, following cooking of the sausage. The casing material not only retains the sausage in link shape but also prevents crumbling or breaking thereof during handling and presents a generally non-tacky, smooth surface preventing adherence of the encased sausages to the packaging material or coherence thereof to one another to an extent which would make the links difficult to separate for handling and cooking purposes. However, the cost of the casing adds materially to the total cost of the manufacture of the product and it has always been considered desirable to eliminate the use of casings. More recently, skinless sausages have been prepared on a commercial scale by various methods. One such method is set out in detail in Patent No. 3,063,842, issued November 13, 1962. In the method therein disclosed the comminuted sausage mix is extruded under pressure and subdivided to provide individual roughly shaped product portions, the individual product portions are at least surface frozen and thereafter subject to a shaping and compacting operation in a closed mold to provide a product which, in its finished shaped, has the appearance of a conventional cylindrical sausage.

It is a general object of the present invention to provide an apparatus for extruding a comminuted sausage mix under pressure and dividing the same so as to provide individual roughly shaped product portions, for chilling the individual product portions so that they are frozen and for subjecting the frozen product to a shaping and compacting operation in a closed mold so as to provide a product which, in its finished form, has a conventional cylindrical sausage shape, with the apparatus operating to carry out the extruding, chilling and shaping of the product in a continuous operation.

It is a more specific object of the invention to provide an apparatus for initially extruding a comminuted sausage mix under pressure to provide individual product portions approximating sausage shape, for carrying groups of the extruded products through a chilling cabinet so as to reduce the temperature and partially freeze the product, and to feed successive groups of the partially frozen products into individual mold cavities where they are compacted to an extent sufficient to provide, when removed from the mold, a product which has a smooth shape, which is internally cohesive and self-sustaining to a degree sufficient for efficient handling thereof at room temperature, which has a smooth surface lacking any tendency to stick to other surfaces or adjacent products under temperature conditions such as 40° F. and which has a pleasing appearance.

It is another object of the invention to provide an apparatus for forming and molding sausage products which apparatus comprises a multiple head extrusion die in which comminuted sausage mix is initially shaped, by extruding under pressure, and subdivided to provide successive groups of roughly shaped product portions which are deposited on successive trays on a traveling conveyor for transport to a chilling cabinet, the trays are carried through the chilling cabinet and the temperature reduced so that the products are frozen when they are delivered from the chilling cabinet and carried by a conveyor to a multiple chamber mold member which is supported on a rotating turret and in which groups of the frozen sausages are compacted by co-operating reciprocal plungers which are operated to feed the sausages into the mold cavities, to compress the same therein so as to provide the desired shape and compacting thereof, and which eject the sausages onto the conveyor for delivery from the machine.

These and other objects and advantages of the invention will be apparent from a consideration of the apparatus which is shown by way of illustration in the accompanying drawings wherein:

FIGURE 1 is a side elevation, with portions broken away, of a sausage forming and molding machine which has incorporated therein the principal features of the invention;

FIGURES 2A and 2B constitute a plan view of the machine with portions broken away or omitted;

FIGURE 3 is a plan view of a portion of the machine, to an enlarged scale, and with portions broken away or omitted, the view showing a portion of the tray feeding conveyor for the sausage extruding head and a portion of the conveyor on which the roughly shaped sausages are initially deposited;

FIGURE 4 is a vertical section taken on the line 4—4 of FIGURE 2A, to an enlarged scale, and with portions broken away;

FIGURE 5 is a vertical section taken on the line 5—5 of FIGURE 4;

FIGURE 6 is a horizontal section taken on the line 6—6 of FIGURE 5;

FIGURE 7 is a partial plan view on the line 7—7 of FIGURE 5, with portions broken away;

FIGURE 8 is a horizontal section taken on the line 8—8 of FIGURE 5, with portions broken away;

FIGURE 9 is a fragmentary elevation on the line 9—9 of FIGURE 5;

FIGURE 10 is a fragmentary elevation taken on the line 10—10 of FIGURE 9;

FIGURE 11 is a vertical cross section taken on the line 11—11 of FIGURE 3;

FIGURE 12 is a cross section taken on the line 12—12 of FIGURE 3;

FIGURE 13 is a fragmentary view taken on the line 13—13 of FIGURE 3;

FIGURE 14 is a fragmentary elevation on the line 14—14 of FIGURE 2B.

FIGURE 15 is a fragmentary vertical section taken on the line 15—15 of FIGURE 14;

FIGURE 16 is a fragmentary horizontal section taken on the line 16—16 of FIGURE 14;

FIGURE 17 is a vertical cross section taken on the line 17—17 of FIGURE 2B, to an enlarged scale;

FIGURE 18 is a fragmentary perspective view at the top of the two ramp or cage formations where the trays are transferred from the one to the other;

FIGURE 19 is a fragmentary, horizontal section at the bottom of the down ramp showing the transfer of the trays from the down ramp to the outfeed conveyor;

FIGURE 20 is a fragmentary vertical section taken on the line 20—20 of FIGURE 2B to an enlarged scale;

FIGURE 21 is a fragmentary elevation taken on the line 21—21 of FIGURE 19;

FIGURE 22 is a fragmentary cross section taken on the line 22—22 of FIGURE 19, to an enlarged scale;

FIGURE 23 is a fragmentary cross section taken on the line 23—23 of FIGURE 19, to an enlarged scale;

FIGURE 24 is a vertical section taken on the line 24—24 of FIGURE 2A, to an enlarged scale;

FIGURE 25 is a vertical section taken on the line 25—25 of FIGURE 2A, to an enlarged scale and with portions broken away;

FIGURE 26 is a vertical section taken on the line 26—26 of FIGURE 25, to an enlarged scale;

FIGURE 27 is a horizontal section taken on the line 27—27 of FIGURE 25;

FIGURE 28 is a vertical section taken on the line 28—28 of FIGURE 26;

FIGURE 29 is a fragmentary view similar to FIGURE 26 with the elements in a different position;

FIGURE 30 is a partial plan view showing adjacent portions of the mold and punch units and associated mechanism;

FIGURE 31 is a partial side elevation of the portion of the machine shown in FIGURE 30;

FIGURE 32 is a partial side elevation of the portion of the machine shown in FIGURE 30, the view being taken on the line 32—32 of FIGURE 2A, to an enlarged scale;

FIGURE 33 is a vertical section taken on the line 33—33 of FIGURE 32;

FIGURE 34 is a partial side elevation of a portion of the machine adjoining the portion shown in FIGURE 32, the view being taken on the line 34—34 of FIGURE 2A, to an enlarged scale;

FIGURE 35 is a partial side elevation of the punch unit, the view being taken on the line 35—35 of FIGURE 2A, to an enlarged scale;

FIGURE 36 is a fragmentary section taken on the line 36—36 of FIGURE 35;

FIGURE 37 is an end elevation of the mold unit, the view being taken on line 37—37 of FIGURE 2A to a somewhat larger scale;

FIGURE 38 is an end elevation of the punch unit, the view being taken on the line 38—38 of FIGURE 2A, to a somewhat larger scale;

FIGURE 39 is a fragmentary view taken on the line 39—39 of FIGURE 31, to an enlarged scale; and FIGURE 40 is a fragmentary section, to an enlarged scale, showing a portion of a mold member and associated molding members in sausage molding position.

Referring first to FIGURES 1 to 3, the apparatus comprises an extruder mechanism 10 which is supported on an upstanding frame structure 11 so as to straddle an endless traveling conveyor 12 also supported on the frame structure 11 and adapted to deliver successive product supporting trays T beneath the extruder mechanism 10. The extruder mechanism 10 receives a sausage batter from a product supply conduit 13 and initially forms the product into a plurality of sausage forming cylindrical sections of somewhat greater diameter and length than the finished links. The sausage forming cylindrical sections are delivered in groups onto the relatively shallow trays T which are transferred beyond the extruder mechanism 10 by a transfer mechanism to a continuously traveling endless transporting conveyor 14 on which they are carried to a chill cabinet 15. Two spiral ramps 16 and 17 are disposed in the chill cabinet with associated mechanism for carrying the trays up the ramp 16, transferring them at the top of the cabinet to the ramp 17, and carrying them down to the bottom of the ramp 17 where they are delivered to an outfeed conveyor 18. The outfeed conveyor 18 extends through a heating zone 19 to a molding or shaping mechanism 20. The mold mechanism 20 includes an indexing mold wheel 21 carrying a series of molds 22 and having associated mechanism for loading the molds 22 from successive trays T, for forming the partially frozen product sections in the molds and ejecting the finished product onto a product discharge conveyor 23. The trays T when they are emptied at the bottom of the path of the mold wheel 21 are advanced on the conveyor 24 to a transfer station 25 at the end of the infeed conveyor 12 for the extruder mechanism 10. Thus the process of forming product sections and shaping the same is carried out continuously and the trays T which serve to convey the product from the extruder mechanism 10 to the chilling cabinet 15 and to the molds 22 on the shaping mechanism 20 travel in a closed circuit or in a closed loop system from the extruder mechanism 10 through the chill cabinet 15, over the heat zone 19 to the former mechanism 20 and back to the extruder mechanism 10.

The extruder mechanism 10 comprises a pair of parallel upstanding side frame plates 30 and 30' (FIGURES 4 to 9) which are connected by cross brace rods 31 at the four corners thereof and supported on a rectangular bottom angle frame 32 which forms part of the upright base frame structure 11 (FIGURE 1). A manifold 33 is supported for vertical reciprocation between the side plates 30 and 30' on a carriage forming slide plate 34 which extends between the plates 30 and 30' and is guided in a vertical path by pairs of vertically spaced rollers 35, 35' and 36, 36' mounted on each of the plates 30 and 30'. The manifold 33 has a plurality of horizontally disposed, cylindrical recesses 37 arranged across the bottom of the carriage 34 in row alignment and extending through the manifold. A sausage batter is delivered into the recesses 37 in the manifold 33 through a header assembly 38 which is connected to the product supply conduit 13. The header assembly 38 is bolted or otherwise secured to the vertical edges of the side frame plates 30 and 30' and has a smooth vertical face for sliding engagement with a spacer plate 40 carried on the face of the manifold carriage 34. Each of the manifold cavities 37 has associated with it a stop rod 41 having a free end thereof slidingly positioned in the end of the cavity opposite the header assembly 38. The stop rods 41 are carried on a cross bar support 42 which is mounted in sliding relation at its opposite ends on a pair of laterally spaced, parallel slide forming rods 43 and 43' extending from the back face of the manifold carriage 34. The mounting bar 42 carries at its opposite ends pivotally mounted yokes 44 and 44' which are pivotally connected at 45 and 45' to the lower ends of operating levers 46 and 46'. The operating levers 46 and 46' are pivotally mounted at their opposite ends on a cross rod 47 and carry intermediate their ends cam follower rollers 48 and 48' which ride on the periphery of cam plates 50 and 50' carried on the ends of a cam shaft 52. The slide rods 43 and 43' are provided on their free ends with cap nuts 53 and 53'. A mechanism is provided for adjusting from one side of the extruder the position of the stop rod mounting bar 42 at the end of its retractive stroke. This mechanism comprises an adjusting shaft 54 (FIGURE 8) mounted in bearing brackets 55 and 55' secured on the rear vertical edges of the side frame plates 30 and 30'. The shaft 54 carries a pair of pinions 56 and 56' which engage with worm gears 57 and 57' on the ends of shafts 58 and 58' which are journaled in the plate brackets 59 and 59', which are threaded at their inner ends and which are received in threaded bores in sleeve members 60 and 60'. The sleeve members 60 and 60' are slidable in cylindrical members 61 and 61' secured to the forward faces of inwardly extending portions of the brackets 59 and 59'. The sleeve members 60 and 60' carry tip forming members 62 and 62' which engage with the cam followers 63 and 63' at the ends of the pins 64 and 64' which connect the yokes 44 and 44' to the ends of the mounting bar 42. The position of the mounting bar 42, when retracted, determines, of course, the retracted position of the ends of the stop rods 41 and in turn the amount of product which each of the cavities 37 can receive, the rods 41 being pushed back by the inflow of the batter from the header assembly 38.

The carriage forming slide 34 and the associated mechanism is reciprocated vertically by cam levers 65 and 65' which are mounted on a cross bar 66 and pivotally connected to links 68 and 68' which are in turn pivoted to connecting brackets 69 and 69' on the top edge of the plate 34. A counterweight 70 is mounted on the ends of arms 71 and 71' which are connected to the cam levers 65 and 65' to urge the levers 65 and 65' in a clockwise direction about the cross rod 66 as viewed in FIGURE 5. The cam levers 65 and 65' carry cam rollers 67 and 67' which are operative in cam grooves 72 and 72' in the plate cams 73 and 73' mounted on the cam shaft 52. The cam shaft 52 carries at one end a miter gear 74 which is driven by a miter gear 75 on a drive shaft 76 journaled in a housing forming section 77 of the one side plate 30' and connected with the main drive for the machine in a manner which will be hereinafter described.

The cavities 37 (FIGURE 5) in the manifold 33 are filled with the sausage product through the delivery conduit 13 and associated header 38 with the product being under pressure and pushing the stop rods 41 to their retracted position. The slide plate 34 is then lowered sufficiently for the open ends of the cavities 37 to clear the header 38, after which the ejector rods 41 are advanced by operation of the cams 50 and 50' to eject the sausage forming sections S which have been initially or roughly formed in the cavities 37. The ejected sausage forming sections S are deposited on a tray T which is advancing on the tray conveyor 12 in a path immediately beneath the manifold 33. A knockdown bar 80 (FIGURES 5, 9 and 10) is mounted adjacent the header 38 and the manifold 33 for insuring that the sausage sections do not stick to the manifold 33. The knockdown bar 80 is carried on a U-shaped frame 81 mounted at its opposite ends on the pivots 82 and 82' extending from upstanding legs of angle brackets 83 and 83' which are mounted on the uppermost flange of a channel support 84 attached to the main frame structure 11. The knockdown bar frame 81 has one side arm extended beyond the pivot 82 and pivotally connected at 85 to a link bar 86 of adjustable length. The link bar 86 is pivoted at its opposite end at 87 to a crank lever 88 which is carried on the inner end of a stub shaft 89 journaled in a bearing 90 mounted on the side frame plate 30. The stub shaft 89 carries a sprocket 91 which is connected by chain 92 with a drive sprocket 93 (FIGURES 6 and 7) on the end of the cam shaft 52 so that the knockdown bar 80 is oscillated in timed relation to the reciprocatory movement of the manifold 33. The knockdown bar 80 scrapes the bottom face of the tapered plate 94 (FIGURE 5) on the bottom of the vertical face plate 95 on the header 38 when the manifold 33 is raised after the ejection of the sausage forming sections at the bottom of the stroke of the slide plate 34 to insure that none of the sausage batter sticks to the bottom of the header face plate 95 and that all of the sausage forming sections are deposited in the traveling tray T as the latter is advanced by the conveyor 12 to the end of the top run thereof where it is positioned beneath the header 38. Cam plates 96 and 96' (FIGURES 5 and 8) are supported in fixed position on the side walls 30 and 30' and in the path of rollers 63 and 63' when the bar 42 is in the forward position for ejecting the sausage forming sections from the cavities 37 and the manifold 33 is in the lowered position where the ends of the rods 41 extend beyond the outer face of plate 40. The cam plates 96 and 96' retract the bar 42 and the rods 41 carried thereby so that the ends of stop rods 41 are moved into the cavities and do not strike the plate 95 when the manifold 33 is returned to raised position.

The conveyor 12 operates as a feed conveyor for delivering the trays T to the extruder mechanism 10. Each of the trays T comprises a base 100 (FIGURES 3, 4 and 5) and a top plate 101 having a plurality of shallow, elongate, upwardly opening pockets 102 for receiving the sausage forming sections S in side-by-side relation. The conveyor 12 (FIGURES 1, 2A, 3 and 5) comprises a pair of chains 103 and 103' mounted on end sprockets 104, 104' and 105, 105' which are supported on cross shafts 106 and 107 journaled in bearings 108, 108' and 109, 109' supported on the upright, generally rectangular frame section 110 forming part of the frame structure 11. The chains 103 and 103' are provided with lugs 112 for engaging the trailing edge of successive trays T. The upper runs of the chains 103 and 103' are supported in parallel, horizontal, laterally spaced rails 113 and 113' so as to guide the chains in a horizontal path. The trays T are supported adjacent their ends on the upper edges of laterally spaced, parallel angle bars 115 which are mounted on the cross channels 114 and which have Nylon bearing strips 115' straddling the upper edges. Side or tray end guide rails 116 and 116' are supported on the cross channels 114 by brackets 117 and 117' and are provided with top guard plates or bars 118 and 118' which restrain the trays T against lateral and vertical movement as they are advanced by the lugs 112 on the chains 103 and 103'. The shaft 107 is extended at one end (FIGURE 11) and carries a sprocket 120 which is connected by a drive chain 121 with sprocket 122 on the output shaft 123 of an indexing gear box 124 of a power drive mechanism.

The gear box or drive unit 124 (FIGURES 11 and 12) is supported on the bottom portion of a rectangular frame section 125 which extends at right angles at the end of the frame section 110. The drive unit 124 has an input shaft 126 at right angles to the output shaft 123 which carries a sprocket 127 connected by the chain 128 with a sprocket 130 on a drive shaft 131 which extends transversely of the frame section 125 and is journaled at its opposite ends in a pair of suitable bearing support brackets 132 mounted in laterally spaced relation on the frame 125. The shaft 131 carries a sproket 133 which is connected by the chain 134 to a sprocket and clutch unit 135 (FIGURE 2A) on the end of the drive shaft 76 for the extruder mechanism 10. The clutch in the unit 135 is provided with a lever for hand operation. The shaft 76 is provided with a hand wheel 136 for manual turning. The drive shaft 131 is connected for constant rotation to the main drive for the machine as hereinafter described.

A transfer conveyor mechanism 140 (FIGURES 2A, 3 and 11) is disposed at the end of the conveyor 12 which receives the trays T from the conveyor 12 and changes their direction of travel into a path at right angles to the path of the conveyor 12 so as to deliver the trays to the conveyor 14. The transfer conveyor 140 comprises a chain 141 having tray advancing lugs or fingers 142 which is supported at one end on a sprocket 143 mounted on a shaft 144 journaled in a bracket 145 supported on the end of the frame structure 125. The chain 141 is supported at the other end on upper and lower sprockets 146 and 147. The sprocket 147 is mounted on a cross shaft 148 which is journaled in bearing forming members 150 mounted on the supporting frame 125. The upper sprocket 146 is mounted on a cross shaft 151 journaled in bearing supports 152 mounted on the supporting frame 125. The shaft 151 carries a sprocket 153 which is connected by chain 154 with a sprocket 155 on the end of the line shaft 156 (FIGURES 2A and 11) which extends parallel with the conveyor 12 and is supported at its opposite ends in bearing members 157 and 158 supported on the frame sections 125 and 110, respectively. The upper run of the transfer conveyor chain 141 is supported on a longitudinally extending guide bar 160 (FIGURE 11) and laterally spaced angle support bars 161 (FIGURE 12) having Nylon wear strips 161' on their upper edges are provided on the frame for supporting the trays T. Also, side guide members 162 and 162' supported on upright brackets 163 and 163' are provided for the trays beginning at the receiving end of the transporting conveyor 14.

A link aligning apparatus 165 (FIGURES 3 and 13) is associated with the transfer conveyor 140. This mechanism comprises an aligning arm 165 pivoted at 165' to the bracket 166 which is in turn pivotally mounted at 166' on a bracket 167 on the frame 125. The arm 165 is held in place on the pivot bracket 166 by a compression spring 168 which yields in case of overload. The arm 165 carries a stop pin 169 which is confined in a slot 169' in a fixed bracket 170 on the frame 125 so as to limit the swinging movement of arm 165. The pivot bracket 166 is pivotally connected at 171 to one end of a link 172 which has its other end pivotally connected at 173 to one arm of a bell crank 174. The bell crank 174 is pivoted at 175 on bracket 176 and carries on its other arm a cam follower roller 177 adapted to engage with a cam plate 178 on a vertically extending shaft 179 which is journaled in the bracket 176. An angle bracket 180 is secured to the bracket 176 and apertured to receive in sliding relation one end of a bolt 181 which is pivotally connected at its other end at 182 to the bell crank 174 and carries a compression spring 183 so as to provide for return of arm 165 as cam 178 permits.

The shaft 179 carries an idler sprocket 184 for a transporting conveyor chain 185 having its other end supported on a sprocket 186 (FIGURES 2B and 14 to 16) on a vertically disposed shaft 187 mounted in top and bottom bearings 188 and 188'. The top bearing 188 is mounted in an inverted U-shaped bracket 189 which is secured in the chill cabinet 15 while the bottom bearing 188' is supported on the framing beneath the chill cabinet. The chain 185 carries upstanding lugs 190 which engage the trailing ends of the trays T as they are advanced to the chain 185 by the transfer conveyor chain 141. The transporting conveyor chain 185 extends from the extruder mechanism 10 along the frame section 125 and into the chill cabinet 15. The trays are supported on the top of the frame section 125 on parallel, laterally spaced angle bars 191 and 191' which are extensions of the angle bars 161 and 161' and held against lateral movement by the guides 192 and 192' which are extensions of guides 162 and 162' and which extend along the frame section 125. The innermost run of the chain 185 is supported on an angle bar 193 which extends to the ramp 16 in the chill cabinet.

The trays T are delivered by the transporting conveyor 14 to the bottom of the first chill cabinet rack 16. The rack 16 (FIGURES 2B and 17) comprises an upright frame structure 200 comprising vertical posts 201 in peripherally spaced, cylinder forming arrangement and carrying upwardly spiraled tray supporting track forming members 202 and 203 which are supported on bracket forming bars 204 extending inwardly in a radial direction from the posts 201. A guide bar or rail 205 of downwardly opening angular cross section is associated with each pair of track members 202 and 203 and supported at the outside periphery of the path of the trays on the vertical posts 201. The trays T are advanced on the tracks 202 and 203 by a rotating spider 206 which comprises a central supporting shaft 207 mounted in vertically disposed relation in the frame 200 and having spoke forming members 208 which support at their outer ends vertically disposed bars 210 rigidly mounted at their top and bottom ends adjacent the corresponding ends of vertically disposed plates 211, having a generally C-shaped cross section as shown in FIGURE 18. The plates 211 are secured on the ends of upper and lower arms 208 of the spider cage. At the entrance end or the tray receiving point of the cage 16 (FIGURE 16) the trays T are advanced by the conveyor chain 185 so that successive trays T move onto the lowermost portions of the support rails 202 and 203 between successive bars 210 on the spider 206. The bars 210 take over the advance of the trays from the lugs 190 on the chain 185 by engaging with the trailing edge of each successive tray as illustrated in FIGURE 16. Rotation of the spider 206 carries the trays T in a spiral path to the top of the cage 16 where they are transferred to the cage 17 (FIGURE 18) for downward travel on the spiral tracks 202' and 203' on the cage 17. The cage is constructed in the same manner as the cage 16 and like parts are indicated by the same numerals primed. The vertical rods or bars 210 of the cage 16 are provided at their top ends with a tray pusher arm 212 which is fixed to the rod 210. The pusher arms 212 take over the forward movement of the trays T as they advance to the transfer or crossover point at the top of the two cages 16 and 17. A crossover track section 213 connects the top ends of the track forming members 202 and 203 on the cage 16 with the top ends of the track forming members 202' and 203' of the cage 17. An L-shaped cam arm member 214 is pivotally mounted on the top of each rod 210 with the short arm extending over the top edge of the plate 211 and carrying a depending pin 215 which is adapted to have a limited movement in a path between the opposite wings of the plate 211 and thus limits the rotational movement of the cam arm 214. A cam plate 216 is suspended from a bracket structure 216' in the top of the cage 16 which is positioned to be engaged by the cam follower pin 217 on the end of the longer arm of cam member 214 and thus controls the movement of the cam member 214. The top portion of a cam follower pin 217 on the end of the cam member 214 engages the cam plate 216 and holds the bottom portion 217' of the pin against the side of the tray to guide the tray out of the curved path and onto the crossover track 213. The relatively long, curved tray pusher arm or finger 212 puses the trays along the track 213 and the trays are held on the track on the side opposite the pin 217 by a crossover side guide 218 in the form of a rail supported on a bracket hung from the frames of cages 16 and 17. A cam bar 219 fixed on the cage 16 near the end of cam plate 216 engages the pin 217 so that the lower portion of the pin 217 clears the crossover track after leaving the cam plate 216. The trays are picked up for advance by finger forming members 220 which are secured on the top ends of the vertical rods 210' on the cage 17. The fingers 220 move the trays T ahead until they are moved into the spiral track on the cage 17 where the bar 210' itself takes over the pushing operation and moves the trays along the downwardly spiraled track until the trays reach the bottom of the cage 17 where they are transferred to the outfeed conveyor 18 for delivery to the shaping mechanism 20.

The cages 16 and 17 (FIGURES 2B and 14 to 20) are arranged in side-by-side tangential arrangement and their tray advancing spiders 206 and 206' are driven by a chain and sprocket arrangement which also drives the infeed conveyor chain 185 for the cage 16 and the outfeed conveyor chain 230 of the outfeed conveyor structure 18. The vertical shafts 207 and 207' of the spiders 206 and 206' are provided at the lower ends thereof with sprockets 231 and 231' (FIGURE 2B) which are connected by a chain 232. Tension and timing is provided in the chain 232 by the take-up sprockets 233 and 234 mounted on vertically disposed stub shafts 235 and 236 which are journaled in suitable bearings on the supporting frame structure beneath the cages 16 and 17. The chain 232 also drives the sprocket 237 (FIGURE 15) on the lower end of the shaft 187 for the infeed conveyor chain 185. The chain 232 is driven by sprocket 238 (FIGURES 2B and 20) which is mounted on the vertically disposed drive shaft 240 and which carries on its upper end the sprocket 241 for the chain 230 on the outfeed conveyor apparatus 18. The shaft 240 is journaled in the bearings 243, 243' mounted on supporting frame members 244 beneath the cage structures 16 and 17, and carries at its lower end a sprocket 245 which is driven by the chain 246 running from the sprocket 247 on the lower end of a vertically disposed drive shaft 248 (FIGURE 32) which is connected to the main drive shaft for the molding apparatus 20 in a manner hereinafter described.

At the bottom of the down ramp or cage structure 17 (FIGURE 19) the trays T are moved from the spiral path on the ramp 17 to the outfeed conveyor apparatus 18 which extends out of the chill cabinet 15 and feeds the trays to the link shaping or forming apparatus 20. The tray supporting track members 202', 203' and the outside guide or guard member 205' of the cage structure 17 are extended in a tangential path and merge with tray support bars 250, 251 and a tray guiding rail member 252, respectively, which extend to the conveyor structure 18. The trays are advanced onto the receiving end of the conveyor structure 18 by engagment of a post 210' on the spider 206' with the trailing edge of each successive tray. The posts 210' advance the successive trays to a point where they are picked up by the upstanding fingers or pusher members 253 carried on the chain 230 which advance the trays along the conveyor structure 18. Each of the posts 210' carries on its bottom end an L-shaped, pivotally mounted cam member 254 (FIGURES 19, 20 and 21) on the free end of the longer arm of which there is mounted a vertically disposed pin 255 having a top portion and depending bottom portion 255'. A fixed cam bar 256 is positioned at the point where the trays are transferred from the spiral path to the straight path of the conveyor 18 so as to engage the bottom pin portion 255' on the arm 254 and hold the top portion of the pin 255 against the side of the tray T so as to guide it out of the circular track of the ramp and onto the straight track of the conveyor structure 18. A cam 257 is also provided which is disposed near the leading end of the cam 256 so as to engage the bottom portion 255' of the pin and guide the arm 254 back into the circular path and to clear the track guide 258 on the straight section of the tray supporting track at the entrance to the conveyor 18. The shorter arm of the cam member 254 underlies the bottom edge of the plate 211' (FIGURE 22) and carries a pin 215' for limiting the rotational movement of the arm 254 in the same manner as described with respect to cam arm 214. The conveyor structure 18 includes an upright supporting frame structure 260 (FIGURES 2A, 21 and 24). The trays T, as they enter conveyor 18, are supported on track forming members 261 and 262 secured on the opposed inner faces of the upright flanges of the guide members 252 and 258. The trays T are advanced by the conveyor chain 230 which has longitudinally spaced angle brackets forming upright pushers or fingers 253 for engaging the trailing edges of the trays T. A hot air producing heater (not shown) is supported on the frame 260 to heat the trays which serves to loosen the sausages, the sausages being generally stuck on the tray surface by the freezing process. The conveyor chain 230 operates in a horizontal plane with the one end being supported adjacent the ramp 17 on the sprocket 241 (FIGURES 19 and 20). At its other end the chain 230 is supported on a sprocket 265 (FIGURE 32) which is mounted on the top end of the vertical shaft 248. The inner run of the chain 230 is supported and guided by the angle bar 252 which extends along the one side of the frame structure 260. The shaft 248 is supported in vertically disposed bearing members 267, 267' which extend laterally of a vertical portion of a supporting frame structure 268 which adjoins the frame 260. The shaft 248 carries on its lower end the sprocket 247 for driving the chain 246. The shaft 248 is driven from the main drive of the machine. It carries a sprocket 269 which is connected by drive chain 270 with a sprocket 271 on the output shaft 272 of the miter box 273. The miter box 273 is mounted on a bracket 274 (FIGURES 2A and 32) which is secured to the machine base frame. The input shaft 276 of the miter box 273 carries a sprocket 277 which is connected by the chain 278 with the sprocket 279 on the main drive shaft 280 for the machine.

The trays T are advanced by the inner run of the conveyor chain 230 through the heating zone and delivered to an intermittently operating, horizontally disposed loading conveyor 285 (FIGURES 2A, 25, 26 and 27) for the molding or shaping and compacting apparatus 20. The conveyor 285 extends on the supporting frame structure 268 from the conveyor 18 on a path along the bottom of the circular path of mold wheel 21 and between the mold and punch unit housings 275 and 295. It advances the trays T into loading position at a loading station 286.

The mold wheel 21 is supported for rotation on a horizontal shaft 291 (FIGURES 2A, 30, 31 and 37) journaled in bearings 292 and 293 on the confronting walls of an intermittent drive mechanism 294 adjoining the housing 275 and housing 295 which is spaced from the housing 275 and connected thereto by pairs of top and bottom brace rods 296, 296' and 297, 297' (FIGURES 2A, 30 and 31). The housing 275 and its associated parts constitute a mold unit while the housing 295 and its associated mechanism constitutes a punch unit with the two units forming together the link molding or shaping apparatus 20.

Main drive motor 300 (FIGURES 1, 2A and 37) is suitably mounted at the outer end of the housing 275 and connected by a shaft mounted reducer apparatus 301 with the main drive shaft 280. The drive shaft 280 extends through the housing 275 (FIGURE 2A) and the housing 295 and furnishes driving power for the entire machine. The drive shaft 280 carries a pinion 302 (FIGURES 2A and 34) which engages with the miter gear 303 on a cross shaft 304 extending laterally through the housing 275 to a side drive housing 305 (FIGURES 1, 2A and 34). A sprocket 306 on the end of the shaft 304 is connected by the chain 307 with a sprocket 308 on the end of a cam shaft 310 extending across the upper part of the housing 275 for operating a back-up mechanism which will be hereinafter described. Another sprocket 311 on the cross shaft 304 is connected by the chain 312 with a sprocket 313 on the end of a cross shaft 314 which extends from the intermittent drive 294 located between the drive housing 305 and the housing 275 of the punch unit. The intermittent drive 294 supports the one bearing 292 for the shaft 291 which carries the mold wheel 21. The driven shaft 314 extends into the intermittent drive mechanism 294 and is connected in driving relation with the shaft 291 through a Geneva or other motion converting device indicated at 315 (FIGURE 2A) so as to turn the shaft 291 intermittently with the mold wheel 21 being rotated 90° at each movement.

The mold wheel 21 carries on its peripheral edge four mold members 22 (FIGURES 1, 2A, 30, 32 and 33) of identical construction which are spaced 90° apart around the periphery of the wheel. Each end of the mold members 22 is secured to the wheel by an angle bracket 316. In the form of the apparatus illustrated, each mold 22 is provided with a plurality of mold forming bores or recesses 317 in which the link forming sausage sections S are compacted and formed into their final shape. The mold members 22 are rectangular in cross section and the bores 317 extend through the entire width of the mold member with the walls being tapered slightly so that the bores are larger at the side which faces the punch unit 295. The mold wheel 21 is operated so that the molds 22 are successively positioned at the loading section 286 (FIGURE 26) at the bottom of the mold wheel 21, a compacting station 318 (FIGURE 32) at one side of the machine and a finished product discharge station 319 (FIGURE 30) at the top of the path of the mold wheel 21. At the loading and discharge stations the molds 22 are disposed in vertically spaced, horizontal planes. At the compacting station 318, the mold 22 at one side of the wheel is disposed in a vertical plane while the opposite mold, at the other side of the wheel, is disposed in a parallel plane at an idler station.

The molds 22 are loaded at the loading station 286 at the bottom of the path of the mold wheel 21 by transferring the sausage forming sections S from each successive tray T to the molding cavities 317 in a mold 22 on the wheel 21. Successive loaded trays T are advanced to the loading statiton 286 by the loading conveyor 285 which comprises the conveyor chain 320 (FIGURES 2A, 25 and 27) having pusher forming fingers 321 for engaging the trailing ends of the trays. The chain 320 is supported at one end on a sprocket 322 mounted on the cross shaft 323 journaled in side plates 324 and 324' which constitute part of the conveyor supporting structure 260 of the feed conveyor 18 and which extend between the mold and punch units as part of the supporting structure 325 for conveyor 285 and associated mechanism. At the other end the chain 320 is supported on a sprocket 326 on a shaft 327 journaled in bearing members 328 and 328' on the supporting frame 325 for the conveyor structure extending between the two housings 275 and 295. The shaft 327 carries a sprocket 329 which is connected by chain 330 with sprocket 331 (FIGURES 2A and 33) on the shaft 291 of the mold wheel 21 so that the tray feeding chain 320 is advanced intermittently in accordance with the intermittent movement of the mold wheel 21. The shaft 327 is extended in the direction of the punch unit and a clutch 332 and spur gear 333 are mounted thereon. The spur gear 333 meshes with a spur gear 334 on the end of drive shaft 156.

The shaft 327 carries at its other end a sprocket 335 which is connected by chain 336 with a sprocket 337 on a cross shaft 338. The cross shaft 338 is journaled in laterally spaced bearings 339 mounted on vertically extending cross members of the support frame 325 and carries a pair of laterally spaced sprockets 340 and 341 supporting at one end parallel endless chain members 342 and 343. The chain members 342 and 343 are supported at their opposite end on sprockets 344 and 345 mounted on a cross shaft 346 which is journaled in the side plates 324 and 324'. The one chain 342 carries longitudinally spaced scraper devices 350 which are connected to the chain by brackets 351 and which scrape the inside face of a guide plate 352 rigidly mounted on the frame structure 325 and having a line of horizontally disposed spaced guide apertures 353 through which the partially formed sausages S are guided into the mold recesses 317 in the mold 22 when the latter is at the loading station 286 at the bottom of the path of the mold wheel 21. The guide apertures 353 are tapered so as to provide a funnel-like guide for passage of the sausages into the mold recesses 317. Upstanding pins 354 are provided along the top edge of the guide plate 352 to assist in breaking up any accumulation of sausage material which may occur due to misalignment of the sausages on the trays and failure thereof to pass through the guide apertures 353. The chain 343 at the other side of the conveyor structure carries angular brackets 355 having upstanding flanges 355' which operate as scraping and cleaning devices for cleaning a holddown mechanism 356 which is mounted on the loading apparatus 360 and which is supported with the loading apparatus 360 on the punch unit housing 295 for reciprocating movement across the path of the loading conveyor 285. A spring pressed bar 357 (FIGURES 25 to 27) is provided for engaging and frictionally holding the trays at the loading station while the frozen sausages are moved into the mold cavities 317. The bar 357 is mounted intermediate its ends on the vertical pivot 357' at the side of the conveyor 285 and urged in a counterclockwise direction by a compression spring 358 disposed between the one end thereof and a portion of the conveyor side frame. The other end of the bar 357 moves in a slot 359 in the vertically extending conveyor side frame member 359' so as to engage the tray T and hold it steady against the plate 352 which constitutes the opposite conveyor frame member. A suitable stop member is provided to limit the movement of the arm 357 so as not to interfere with the advance of the trays by the conveyor 285.

The loading apparatus 360 (FIGURES 26 to 29 and 31) which transfers the partially formed, frozen sausages S from the tray T to the shaping recesses 317 in the mold 22, comprises a supporting frame 361 of generally triangular cross section which is attached along the back side thereof to the free ends of a pair of horizontally disposed support rods 362 and 362'. The support rods 362 and 362' are slidably mounted in bearings in the bottom or base portion 365 of the punch unit 295. The supporting frame 361 carries at its forward side 366 a series of spaced loading punches 367 which have a cross section as shown in FIGURES 28. The loading punches 367 are spaced to correspond with the spacing of the recesses 317 in the mold 22 and the frame 361 is mounted so as to align the punches 367 with the apertures 353 in the vertically disposed guide plate 352. In the retracted position of the frame 361 as shown in FIGURE 26 the punches 367 are disposed on the side of the feed conveyor 285 opposite the guide plate 352.

The holddown apparatus 356 (FIGURES 26 to 29) which is associated with the loading apparatus 360 comprises a plurality of guide pins 373 depending from a cross bar 374 on the forward side of a rectangular supporting frame 375. The holddown frame 375 which has a cross section as shown in FIGURE 26 is pivotally connected at 376, 376' and 377, 377' to the forward ends of pairs of forward and rearwardly located crank arms 378, 378' and 380, 380'. The crank arms 378, 378' are located intermediate the forward and back sides of the frame 375 and are mounted on a pivot shaft 381 which is parallel with the loading conveyor 285 and supported in bearings 382 and 382' carried on upstanding arms 383, 383' on the frame 361. The pivot shaft 381 carries at its center a crank arm 384 on the lower end of which there is a cam follower 385 positioned to engage the upper horizontally disposed cam plate 386. The cam plate 386 is carried between lower, horizontally disposed spaced legs 387, 387' of a pair of supporting angle brackets which have vertically disposed legs 388, 388' bolted or otherwise secured to a bracket member 390 on the face 365 of the housing 295 above the loading station 286. The rear crank arms 380 and 380' which are pivotally connected at 377 and 377' to the rear edge of the holddown frame 375 are carried on the pivot shaft 391 which is supported in bearing forming members 392 and 392' at the rear of the loading punch frame 361. The pivot shaft 391 carries a downwardly depending crank arm 393 at its center on the lower end of which a cam follower roller 394 is mounted. The cam follower roller 394 is positioned to engage the lower cam track 395 on the lower cam plate 396 which is mounted on the support 325 for the conveyor 285. When the loading punch apparatus 360 is moved forwardly to engage the sausages S on the tray T, the cam follower 385 rides up the inclined rear end and onto the top of the upper cam plate 386 and tilts the forward portion of the holddown frame 375 downwardly so as to bring the bar 374 at the front side down onto the top of the sausages S with the ends of the pins 373 disposed between the sausages. Continued forward movement of the frame 361 carries the holddown frame 375 forward in the down position until the cam follower roller 394 rides up on the cam track 395 and lifts the forward portion of the holddown frame 375 to raise the holddown bar 375 which releases the links S and permits the punches 367 to be advanced through the apertures 353 in the guide plate 352 for insertion of the sausages into the mold recesses or pockets 317 as shown in FIGURE 29. A pair of tension springs 396 (FIGURES 26 and 27) are connected at one end to posts 397 mounted on the forward wall 366 of the frame 361 and at the other end to pins 398 on the crank arm 393 which operate to return the holddown bar, guide pins and associated parts to their initial position as the punch assembly returns to its retracted position after loading the sausage links into the mold from the tray.

The loading apparatus 360 is reciprocated by a fluid motor or hydraulic cylinder 400 (FIGURES 1, 2A, 27 and 36) which is mounted on a support bracket 401 on the end of the housing 295 for the punch unit. The piston 402 for the cylinder 400 is connected to a horizontally disposed frame 403 within the housing 295 which carries the support rods 362 and 362' and also a pair of guide rods 404 and 404', the latter being slidable in bearings in the wall of the housing 295. The fluid motor 400 is connected by suitable conduits to a fluid supply line through a sequence valve 407. The valve 407 is operated by a plate cam 408 mounted on a stub shaft 409 journaled in the bracket 401 mounting the hydraulic unit on the housing 295 and carrying a sprocket 410 which is driven by a chain 411 and sprocket 412 mounted on the main drive shaft 280.

After the mold 22 is filled with sausage elements S at the loading station 286, the mold wheel 21 is indexed to the compacting station 318 (FIGURE 32) at the side of the machine where the frozen sausage elements S are compacted to form the finished product. At the compacting station 318 the mold 22 which has been filled at station 286 is at one side of the wheel 21 and is disposed in a vertical plane between a compacting punch assembly 415 and a back-up assembly 416. The punch assembly 415 is mounted on the punch unit housing 295 while the back-up assembly 416 is mounted on the mold unit housing 275 in oppositely disposed relation to the assembly 415, the two assemblies being aligned on opposite sides of the mold 22 when the latter is at the station 318. The operation of the cylinder 400 is, of course, timed to advance the loading mechanism 360 when the mold 22 is in position to receive the sausage elements at the loading station 286.

The back-up mechanism 416 (FIGURES 32 and 34) comprises a plurality of punch elements 417 which are relatively short in length and which are mounted on a back-up plate 418. The punch elements 417 preferably have cupped ends 420 for rounding the ends of the sausage sections. They are arranged on the support plate 418 in alignment with the apertures 317 in the mold 22 when the latter is in proper position for the shaping or molding operation. The back-up plate 418 is mounted on the forward end of a reciprocating frame 420 having a front plate 421 at the front ends of four push rods 422 which are arranged in spaced, rectangular forming relation and which are slidably mounted in front and rear bearing apertures 423 and 424 in the housing 275. The front bearing apertures 423 are in the forward wall of the housing 275 while the rear bearing apertures 424 are in spaced relation thereto in a cross member within the housing. A plate 425 connects the push rods 422 between the two sets of bearings 423 and 424 and is provided with a pair of ears 426 on a vertical center line which are pivotally connected at 427 to the ends of a pair of links 428. The links 428 are pivotally connected at their other ends at 430 to the ends of the longer arms 431 of a pair of bell crank members 432. The bell cranks 432 are mounted on fixed pivots 433 in the housing 275. The shorter arms 434 of the bell cranks 432 are pivotally connected at 435 to a pair of relatively short links 436 having their other ends pivotally connected at 437 to a roller carrier 438. The roller carrier 438 is mounted on a set of horizontally disposed guide rods 440 for horizontal sliding movement. The rods 440 are supported within the housing 275. The roller carrier 438 carries a cam follower roller 441 which operates in a cam slot 442 in the one face of a plate cam 443 which is mounted on the cross shaft 310. Rotation of the plate cam 443, of course, reciprocates the roller carrier 438 and this in turn operates the bell cranks 432 and the links 428 to reciprocate the carriage 420 for the back-up rods 417. The rotation of the cam plate 443 is, of course, timed so that the rods 417 are moved into back-up position with the ends thereof substantially flush with the surface of the mold and aligned with the recesses 317 when the mold 22 has been indexed into proper position at the compacting station 318.

The sausage compressing shaping punch assembly 415 (FIGURES 32 and 35) comprises a series of punch rods 450 of substantial length which are mounted in spaced relation on a supporting plate 451. The plate 451 is supported on the forward face of a carriage 452. The carriage 452 comprises a front plate 453 and four push rods 454 extending therefrom in rectangular arrangement. The push rods 454 are mounted in sliding relation in spaced sets of front and rear bearing members 455 and 456, the former being in the forward wall of the punch unit 295 and the latter being in a cross member spaced from the forward wall thereof. The push rods 454 are connected between the sets of bearings 455 and 456 by a push rod plate 458 which has connected thereto the ends of a pair of connecting rods 460 by the pivot pins 461. The connecting rods 460 are connected at their other ends on a vertical crank shaft 465. The vertically extending crank shaft 465 is mounted in a plurality of vertically space bearing supports 466 in the housing 295 and carries at its lower end a bevel gear 468 which meshes with a co-operating bevel gear 470 on the main drive shaft 280.

A sleeve member 471 (FIGURE 32) which forms an extension of the mold cavities 317 has a series of spaced apertures 472 for accommodating the punches 450 and is mounted on a vertically extending support plate 473 at the forward end of a supporting frame 474. The frame 474 inculdes a pair of upper and lower guide rods 475 which are mounted in sliding relation in pairs of vertically spaced front and rear bearing members 476 and 476' (FIGURES 30, 32 and 35) on opposite sides of the forward wall of the housing 295. The support rods 475 carry at their other ends cam follower rollers 477 which are received in cam tracks 477' in upper and lower cam plates 478 which are mounted in vertically spaced relation on the vertically disposed crank shaft 465. The punch supporting frame 452 and sleeve member 471 are both reciprocated by operation of the crank shaft 465. The sleeve member 471 is moved for the shaping operation substantially flush with the oppositely disposed face of the mold 22 while the punches 450 are moved by reciprocation of the frame 452 in the apertures 472 in the sleeve 471 to effect the compacting of the links which are disposed in the molding recesses 317 in the mold member 22 with their ends extending into the sleeve member 471. The forward ends of the mold members 450 are preferably cupped to provide a rounded end on the sausage members. The compacting and shaping punches 450 and the back-up punches 420 co-operate to compress the sausages between the same so as to uniformly shape the sausages and give them the conventional appearance of sausage links as well as compacting the material in each link.

In order to insure that the molds 22 are held immobile at the station 318, pairs of vertically spaced thrust buttons 480 and 481 (FIGURES 2A and 32) are mounted on supporting brackets 482 and 483 disposed immediately above and below the forming punch assembly 415 and the back-up assembly 416. The brackets 483 are mounted on the ends of the bearing members 476 while the brackets 482 are mounted directly on the face of the mold housing 275. The mold 22 moves between the thrust buttons 480 and 481 as it is indexed into position at the compacting station 318 so that it is braced at each end by engagement of the buttons with the oppositely disposed vertical faces of the mold.

After the molding or shaping operation, the mold 22 is moved to the discharge station 319 (FIGURES 1, 2A, 30 and 32) at the top of the path of the mold wheel 21, where the finished sausages S are ejected from the mold cavities 317 by means of an ejector mechanism 485. The ejector mechanism 485 comprises a series of ejector or punch members 486 of cylindrical form mounted in spaced relation on a support plate 487. The support plate 487 is mounted on the forward face of a frame plate 488 at the forward end of a supporting frame or carriage 490. The carriage 490 includes four horizontally disposed support rods 491 arranged in rectangular forming relation and slidably mounted in forward and rearward bearings 492 and 493, the former being in the forward wall of the housing 295 and the latter within the housing in spaced relation thereto. The rods 491 are connected by a cross plate 494. A pivot shaft 495 is mounted above the carriage 490 in a pair of laterally spaced bearings 496 depending from the top wall within the housing 295. A crank arm forming frame 497 is connected to the pivot shaft 495 at one end and pivotally connected at the other end at 498 to one end of a link 498' which is connected at its other end to bearing ears 499 on the cross plate 494 of the carriage 490. The pivot shaft 495 is extended at one end and has a crank arm 500 thereon with a cam follower roller 501 on the lowermost end thereof. The cam follower roller 501 rides in a vertical slot 502 in the side of a horizontally disposed slide shaft 503. The slide shaft 503 is mounted in a pair of spaced bearings 504 and has a cam follower 505 at the rear end thereof. The cam follower is received in the cam track 506 of a plate cam 507 mounted on the top end of the crank shaft 465. Rotation of the crank shaft 465 reciprocates the frame 490 and moves the unloading punches 486 through the cavities 317 in the mold 22 so as to eject therefrom the formed sausage links S. The completely formed links S are delivered onto the one run of a horizontally disposed discharge conveyor, indicated at 23, and which removes the links from the machine.

The main drive shaft 280 is extended at the rear face of the punch unit housing 295 to a bearing member 508 (FIGURES 2A and 11) which is mounted on the conveyor supporting structure 125. A sprocket 509 is secured on the shaft 280 and connected by chain 510 with a sprocket 511 on the drive shaft 131 which is connected in driving relation with the gear box 124 and also with the drive for the intruder 10 so as to furnish power for operation of the extruder 10 and the associated tray handling mechanism.

Apparatus is provided for scraping the oppositely disposed faces of the mold members 22 after the finished product is removed therefrom so as to remove any particles of the product which may have accumulated on the mold faces. This apparatus comprises a pair of V-shaped scraper members 515 and 515' (FIGURES 30, 31 and 39) each formed by joining two plates at an apex forming edge 516, 516' with each edge constituting a blade which is positioned against the face of the mold as the latter moves through the fourth or idler station which is opposite the compacting station 318. The scraper members 515 and 515' are each pivotally mounted on a cylindrical portion 517 of a bracket forming rod 518, 518' with a torsion spring 519 carried on the rod portion 517 and connected to the respective member so as to urge the members in the direction to move the edges 516 and 516' away from the mold faces. The support rods 518 and 518' are secured on the ends of a support member 520 at the top of a support bracket 521 which is secured to a vertical frame member 522 extending upwardly of the conveyor support structure 325. The members 515 and 515' are disposed at an angle to the horizontal as shown in FIGURE 39 and each successive mold 22 enters between the inwardly tilted, oppositely disposed bottom portions of the inner plates as it approaches the scraper members 515 and 515' and swings the members to bring the scraper edges 516 and 516' into scraping engagement with the mold faces.

In operating the machine the conduit 13 (FIGURE 2A) is connected by a suitable line to a container holding a supply of sausage mix under pressure. The cooling cabinet 15 (FIGURE 2B) is supplied with the desired cooling elements so as to reduce the temperature in the cabinet to the required point. The drive for the main shaft 280 is placed in operation. The extruder 10 and the mold wheel 21 are both driven intermittently. The tray feeding conveyor 12 operates intermittently to position successive trays T beneath the extruder manifold 33 (FIGURE 5) for receiving the rows of sausage portions as they are ejected by the rods 41 from the cavities 37. The loaded trays T are transferred by mechanism 140 (FIGURE 3) to the conveyor 14 which operates continuously and delivers the loaded trays to the up ramp 16 in the chilling cabinet. The trays are carried through the relatively long path provided by the two ramps 16 and 17 in the chilling cabinet and delivered to the outfeeding conveyor 18 at the bottom of the down ramp 17. The sausage portions are frozen on the trays T as they emerge from the chill cabinet 15. They are advanced by the intermittently operating conveyor 285 to the loading station 286 (FIGURE 26) where the loading mechanism 360 transfers each group to the cavities 317 in a mold 22 on the mold wheel 21. The sausage portions S are somewhat longer than the length of the mold cavities 317 and they are moved into the cavities 317 by the loading punches 367 so that they project on the side of the mold opposite the loading punches. The empty trays are advanced to the end of conveyor 285 and delivered to the feed conveyor 12 for the extruder head. The mold wheel 21 is turned intermittently to bring the loaded molds 22 from the loading station 286 at the bottom of the path of the wheel 21 to the compacting and shaping station 318 (FIGURE 32) at one side of the wheel where the back-up punches 417, the sleeve member 471 and the compacting punches 450 are reciprocated to compact or compress the frozen sausage portions and mold the same (FIGURE 40). The back-up punches 417 are advanced to a position substantially flush with the face of the mold member 22 and push the sausage sections S toward the opposite face of the mold member 22 where their ends extend into the sleeve member 471. The ends of the punches 450 are moved in the sleeve member 471 and the sleeve and punch assembly moves toward the mold member 22 until the face of the sleeve is substantially flush with the face of the mold. The punches 450 are moved to compact the sausage portions so that they have the shape of link sausage made in the conventional manner. The back-up punches 417 and the punch and sleeve assembly 471 and 450 are retracted leaving the sausages projecting somewhat from the face of the mold member 22 on the sleeve side. The mold wheel 21 is indexed to bring each mold 22 to the topmost position after the compacting and molding operation where the finished sausages are ejected onto a discharge conveyor 23 by the unloading punches 486. The finished sausages S are moved through the cavities 317 by the punches 486 and any material clinging to the surface, such as the flash which may be formed by material squeezed out between the mold surface and the sleeve member 471 during the compacting operation, is wiped off by movement of the sausages through the smaller end of the slightly tapered cavities 317.

While particular materials and specific details of construction are referred to in describing the illustrated form of the machine, it will be understood that other materials and equivalent structural details may be employed within the spirit of the invention.

We claim:
1. A machine for forming, chilling and shaping sausage products which comprises an extruder apparatus having a multiple cavity die at a fixed position, means for feeding a comminuted sausage mix into the cavities in the die, means for ejecting the sausage mix from the cavities in the die to provide a group of roughly shaped product portions, a plurality of product supporting trays, conveyor means for advancing successive trays to a product receiving station adjacent the cavity die, a chilling cabinet, conveyor means for advancing the trays from said product receiving station to the chilling cabinet, conveyor means in the chilling cabinet for transporting the trays through a relatively long path in the chilling cabinet, a product compacting and shaping apparatus adjacent the chilling cabinet and including a plurality of molds each having a plurality of product receiving cavities arranged in a row, means for positioning the molds successively at a loading station, a compacting station and a finished product discharge station, conveyor means for advancing successive trays from the chilling cabinet to the loading station of the compacting and shaping apparatus and for thereafter delivering the empty trays to the conveyor means for advancing trays to the extruder apparatus, means at said loading station for transferring the roughly shaped and chilled product portions from each successive tray to the cavities in a mold, means at the compacting station for compacting and shaping the product portions in the mold cavities and means at the product discharge station for ejecting the compacted and shaped product portions from the mold cavities.

2. A machine for forming and molding sausage products which comprises an extruder apparatus having a die with a plurality of cylindrical cavities, means for feeding a comminuted sausage mix into the cavities in the die, means for extruding the sausage mix from the cavities in the die to provide a group of roughly shaped cylindrical product portions, a plurality of product supporting trays, means for positioning successive trays at a product receiving station adjacent the die cavities for receiving the product portions, a chilling cabinet, means for advancing the trays from the extruder apparatus to the chilling cabinet, means for transporting the trays through a relatively long path in the chilling cabinet so as to freeze the product, a product compacting and molding apparatus adjacent said chilling cabinet which comprises a plurality of mold members each having a plurality of product receiving cavities corresponding to the number of cavities in the extruder apparatus, means for positioning the mold members successively at a loading station, a compacting and molding station and a discharge station, said stations being spaced from each other, means for advancing successive trays from the chilling cabinet to the loading station of the compacting and molding apparatus, means at said loading station for transferring the partially frozen roughly shaped product portions from successive trays to the cavities in the mold members, means at the compacting and molding station for compacting the product portions in the mold cavities, and means at the discharge station for ejecting the product portions from the mold cavities.

3. A machine for forming sausage products which comprises an extruder apparatus having a forming die with a plurality of cylindrical cavities, means for feeding a comminuted sausage mix into the cavities in the die, means for extruding the sausage mix from the cavities in the die to provide a group of roughly shaped cylindrical product portions, a plurality of product supporting trays, means for intermittently transporting the trays and positioning successive trays at a product receiving station adjacent said extruder apparatus, a chilling cabinet, means for advancing the trays continuously from the product receiving station to the chilling cabinet, means for continuously advancing the trays through a relatively long path in the chilling cabinet and chilling the product, a product molding apparatus comprising a plurality of mold members each having a plurality of cylindrical product receiving cavities corresponding to the number of cavities in the forming die, means for positioning the mold members successively at a loading station, a molding station and a discharge station, a first conveyor means for continuously advancing the trays from the chilling cabinet toward the loading station of the molding apparatus, a second conveyor means for receiving the trays from said first conveyor means and intermittently positioning the trays at the loading station, means at the loading station for transferring the roughly shaped and chilled product portions form successive trays to the cavities in the mold members, means at the molding station for compacting and shaping the product portions in the mold cavities and means at the discharge station for ejecting the molded product portions from the mold cavities.

4. A machine for forming, chilling and shaping sausage products having the general form of sausage links which comprises apparatus having a die with a plurality of cylindrical product forming cavities arranged in parallel, row forming relation therein, means for feeding a comminuted sausage mix into the cavities in the die, means for compressing the sausage mix in the forming cavities and for ejecting the same to provide a group of roughly shaped product portions, a plurality of product supporting trays, means for positioning successive trays at the ends of the cavities so as to receive the product portions from the forming cavities, a chilling cabinet, means for advancing the trays from the product receiving position to the chilling cabinet, means for transporting the trays through the chilling cabinet, a product compacting and shaping apparatus comprising a plurality of mold members each having a plurality of product receiving cavities, means for positioning the mold members successively at a loading station, a compacting and shaping station and a product discharge station, means for advancing successive trays from the chilling cabinet to the loading station of the compacting and shaping apparatus, means at said loading station for transferring the roughly shaped product portions from successive trays to the cavities in the mold members, means at the compacting and shaping station for compressing and shaping the product portions in the mold cavities and means at the product discharge station for ejecting the compacted and shaped product portions from the mold cavities.

5. An apparatus for compacting and shaping successive groups of sausage forming product portions which are in the form of elongate cylindrical sections, said apparatus comprising a turret supported on a horizontal axis, mold members mounted in peripherally spaced relation on said turret, said mold members each having a plurality of cylindrical product receiving cavities arranged in row formation and in a plane which is substantially normal to a diametrical plane extending through the axis of rotation of the turret, means for intermittently rotating the turret to bring the mold members successively to a loading station, a compacting and shaping station, and a discharge station, means at the loading station for simultaneously feeding a group of previously formed product portions into the cavities in a mold member, reciprocably mounted punch means along opposite sides of the turret at the compacting station which is operated to engage the product portions at opposite ends in each of the mold cavities so as to compact and shape the same, and punch means mounted for reciprocating movement at one side of the discharge station which is disposed on the side of the turret opposite the loading station for ejecting the compacted and shaped product out of the mold cavities.

6. An apparatus for compacting and shaping successive groups of roughly shaped cylindrical sausage forming product portions which comprises a rotatably mounted turret support, a plurality of mold members mounted in spaced circumferential relation about the periphery of the turret, said mold members each having a plurality of cylindrical product receiving cavities arranged in row formation therein with each row extending in a plane which is substantially normal to a diametrical plane extending through the axis of rotation of the turret, means for rotating the turret to bring the mold members successively to a loading station, a compacting and shaping station, and a discharge station, said stations being spaced about the periphery of the turret, punch means reciprocably mounted on a frame at one side of the loading station for delivering a plurality of the previously formed, roughly shaped product portions into the cavities in a mold member, co-operating punch means reciprocably mounted on opposite sides of the path of the turret at the compacting station for engaging the product portions at opposite ends in each of the mold cavities so as to compact and shape the same, punch means at the discharge station for ejecting the compacted and shaped product out of the mold cavities, and scraper members for engaging opposite faces of the mold members at a point beyond the discharge station.

7. An apparatus for compacting and shaping successive groups of roughly shaped cylindrical sausage forming product portions, which apparatus comprises a wheel-like turret supported on a horizontal axis for rotation in a vertical plane, a plurality of generally rectangular, elongate mold members mounted in spaced relation on the periphery of said turret, means for intermittently rotating said turret to bring the mold members to a plurality of successive work stations spaced about the periphery of the turret, said mold members each having a plurality of elongated cylindrical mold cavities which are each generally parallel with said horizontal axis, said mold cavities being arranged in spaced, parallel row forming relation on the periphery of the turret and opening on opposite vertical faces of the mold member, a traveling conveyor having tray forming means thereon for supporting groups of product portions in parallel row forming relation, said conveyor having a horizontally disposed, tray carrying run thereof arranged to deliver successive groups of the product portions which are in generally parallel, single row relation to a work station at the bottom of the path of the turret and alongside a vertical face thereof for transfer to the mold members, punch means at said work station mounted for movement across the tray carrying run of the conveyor for feeding the product portions from the conveyor into the cavities in the mold members.

8. An apparatus as recited in claim 7, and a vertically disposed guide plate mounted at said loading station, which guide plate has a plurality of funnel-like apertures arranged so as to be aligned with the openings in the mold cavities when a mold is positioned at said work station thereby forming guideways for the product portions when said product portions are fed from the conveyor by said punch means.

9. An apparatus as recited in claim 7, and scraper members mounted on a traveling chain for clearing the face of said guide plate which extends along said tray carrying conveyor.

10. A machine for continuously forming and shaping sausage products having the general form of sausage links which comprises initial forming apparatus having a die with a plurality of cylindrical sausage forming cavities arranged in parallel row forming relation therein, means for feeding a sausage mix into the cavities in the die, means for cutting off the flow of the sausage mix in the forming cavities when they are filled and for ejecting the same to provide a group of roughly shaped sausage link portions, a plurality of supporting trays, means for positioning successive trays to receive the sausage portions from the forming cavities, a chilling cabinet, means for advancing the trays to the chilling cabinet, means for moving the trays through the chilling cabinet, a compacting and shaping apparatus comprising a plurality of mold members each having a plurality of cylindrical cavities, means for positioning the mold members succesively at a loading station, a compacting and shaping station and a discharge station, means for advancing successive trays from the chilling cabinet to the loading station of the compacting and shaping apparatus, means for supplying heat to the trays to loosen any sausage portions which may adhere to the surface of the trays through chilling, means for transferring the chilled sausage portions from successive trays to the cavities in the mold members, means at the compacting and shaping station for compressing and shaping the sausage portions in the mold cavities and means at the discharge station for ejecting the compacted and shaped sausages from the mold cavities.

11. Apparatus for forming sausages of elongate cylindrical form which apparatus comprises an upright supporting frame, a vertically disposed carriage mounted for vertical reciprocation in said supporting frame, a manifold on said carriage having a row of spaced cylindrical recesses extending horizontally through the bottom portion thereof, a header assembly mounted in fixed position on said supporting frame, a conduit connecting the header assembly to a supply of sausage mix under pressure, said header assembly having a vertical face which is engaged in sliding relation by a vertical face of said manifold, said header assembly having apertures in said vertical face, providing passage for the sausage mix into the forward ends of the recesses in the manifold in one position of the carriage, stop rods mounted on a cross bar and having the ends thereof slidingly received in the other ends of the recesses in the manifold, means for limiting the movement of the stop rods, means for lowering the carriage to position the manifold with the forward ends of the recesses below the header assembly when the recesses are filled so as to cut off the flow of sausage mix and open the forward ends of the recesses means for advancing the cross bar to move the stop rods in the recesses so as to bring the ends thereof adjacent the forward ends of the recesses for ejecting the sausages thus formed therein, and a bar supported below the header assembly for swinging movement to engage and wipe the vertical surface of the manifold after the sausages are ejected so as to pull loose any of the sausages which cling to the manifold.

12. Apparatus for forming link type sausages which comprises an upright supporting frame, a vertically disposed carriage mounted for vertical reciprocation in said supporting frame, a manifold on the bottom portion of said carriage having a row of spaced cylindrical recesses extending horizontally through said manifold, a hollow header assembly mounted in fixed position on said supporting frame, with an apertured vertical face which is engaged in sliding relation by a forward vertical face of the manifold, a conduit connecting the header assembly to a supply of sausage mix under pressure so that in one position of the carriage relative to the header assembly the apertures in the vertical face are in aligned and communicating relation with the recesses in the manifold and the sausage mix is fed through the apertures into the recesses, stop rods mounted on a supporting frame with their free ends slidingly received in the ends of the recesses in the manifold which are opposite the header assembly, means for limiting the movement of the stop rods in the direction away from the header, means including a cam operated crank for lowering and raising the carriage relative to the header assembly, the flow of sausage mix into the recesses being cut off when the recesses are filled by lowering the carriage and moving the recesses out of alignment with the apertures in the vertical face of the manifold and means including a cam operated crank for advancing the stop rod supporting frame when the carriage is lowered thereby moving the stop rods into the recesses and ejecting the sausages formed therein.

13. Apparatus as recited in claim 12, and a conveyor having a horizontal run extending beneath said reciprocating carriage, a plurality of sausage supporting trays carried on said conveyor, means to operate the conveyor in timed relation to the operation of said stop rods so as to move the trays into position for receiving the sausages as they are ejected from the recesses in the manifold.

14. An apparatus for compacting and finish shaping successive groups of roughly shaped cylindrical sausage forming product portions, which apparatus comprises a supporting turret rotatably mounted on a horizontal axis, a plurality of mold members mounted in spaced, circumferential relation on said supporting turret, means for intermittently rotating said supporting turret to position each mold member at a plurality of successive work stations, said mold members each having a plurality of elongated cylindrical mold cavities arranged in parallel row forming relation and opening on opposite vertical faces of the mold member, a traveling conveyor having tray forming means thereon for supporting groups of product portions in parallel row forming relation, each tray forming means supporting a group of said product portions corresponding in number to the number of cavities in said mold members, said conveyor having a tray carrying run thereof arranged to deliver successive groups of the product portions to one of said work stations for transfer to the mold members, means at said work station for moving the group of product portions from the conveyor tray forming means into the cavities in the mold members, means at a subsequent work station for compacting and finish shaping the product portions in the mold cavities, and means at a third work station for ejecting the product portions from the mold cavities.

15. An apparatus as recited in claim 14, and said means for moving said product portions from the conveyor tray forming means into the mold cavities comprising a plurality of punch members mounted on a reciprocating frame, a holddown device mounted on said reciprocating frame, and means for reciprocating said holddown device in timed relation to the movement of the reciprocating frame to hold the product portions in properly aligned relation while they are moved into cavities in the mold members.

16. In a machine for forming skinless sausages, extruder means for roughly shaping sausage forming material into cylindrical sections of equal length, a cooling cabinet having mounted therein a pair of upright frames in side-by-side relation, a plurality of trays for supporting groups of the roughly shaped sausage sections, a conveyor for transporting the trays from the extruder means to the bottom of one of said upright frames, tray supporting track members arranged in upwardly and downwardly spiraled ramp forming relation in said frames, means for moving successive trays from said conveyor to the upwardly spiraled track members at the bottom of the one frame, means associated with said frames for moving the trays upwardly on the one ramp and downwardly on the other ramp in a continuous stream, discharge conveyor means at the bottom of the other one of said upright frames for advancing the trays out of the cooling cabinet, and means for moving successive trays from the bottom of the ramp in the other one of said frames to the discharge conveyor.

17. In a machine for forming skinless sausages, means for roughly shaping sausage forming material into cylindrical sections of substantially equal length, a cooling cabinet having mounted therein a pair of upright frames in side-by-side relation, a plurality of trays for supporting groups of the sausage forming sections, a conveyor for moving the trays from the forming means to the bottom of one of said upright frames, tray supporting track members arranged in upwardly and downwardly spiraled ramp forming relation in said frames, means for transferring loaded trays from said conveyor to the bottom of said upwardly spiraled ramp, rotatable spider members in said frames having means thereon for moving the trays upwardly on the one ramp and downwardly on the other ramp, a discharge conveyor at the bottom of the other one of said upright frames and means for delivering the trays from the downwardly spiraled ramp to the discharge conveyor for advance out of the cooling cabinet.

18. In a machine for forming skinless sausages, extruder means for roughly shaping sausage forming material into cylindrical sections of substantially equal length, a cooling cabinet having mounted therein a pair of upright frames in side-by-side relation, a plurality of trays for supporting groups of the sausage forming sections, an intermittently operating conveyor for advancing the trays beneath the extruder means to receive groups of sausage forming sections thereon, a second conveyor for continuously advancing the trays from the extruder means to the bottom of one of said upright frames, means for transferring trays from the first conveyor to the second conveyor, tray supporting track members arranged in upwardly and downwardly spiraled ramp forming relation in said frames, means for transferring trays from the second conveyor to the bottom of the upwardly spiraled ramp, means associated with said frames for continuously moving the trays upwardly on the one ramp and downwardly on the other ramp, a continuously operating conveyor at the bottom of the other one of said upright frames for advancing the trays out of the cooling cabinet and means for transferring the trays from the bottom of the downwardly spiraled ramp to said last mentioned conveyor.

19. An apparatus for forming and molding sausage products which comprises an extruding head having a plurality of elongate cylindrical cavities therein, means for delivering a comminuted sausage mix into said cavities, means for ejecting the sausage mix from said cavities to provide successive groups of roughly shaped product portions, a product chilling cabinet, a product shaping and compacting device, a plurality of trays for supporting the groups of product portions, and a series of associated conveyors having tray supporting runs extending beneath the extruding head, from the extruding head through the chilling cabinet and past the product shaping and compacting apparatus to the extruding head, means for transferring the trays from each conveyor to the next succeeding conveyor, and means for driving the conveyors in timed relation whereby to transport the trays in an endless path and in an endless procession from extruding head through the chilling cabinet to the product shaping and compacting apparatus and beneath the extruding head.

20. An apparatus as recited in claim 19, and said tray transporting conveyors including a feed conveyor having its tray supporting run disposed horizontally and extending beneath the extruding head so as to position the trays at the leading end of the run for receiving the product portions from the extruding head.

21. An apparatus as recited in claim 20, and a tray advancing conveyor having its tray supporting run disposed horizontally and extending in a direction normal to the path of said feed conveyor and tray transfer means at the leading end of said feed conveyor for moving the trays laterally therefrom and onto the trailing end of said tray advancing conveyor.

22. In an apparatus for compacting and shaping successive groups of previously formed sausage product portions which are roughly shaped in the form of elongate cylindrical sections, said apparatus comprising a wheel-like turret supported on a horizontal axis, mold members mounted in peripherally spaced relation on said turret, said mold members each having a plurality of cylindrical product receiving cavities arranged in spaced row formation and parallel with the axis of rotation of the turret, the cavities of each mold member being in a plane extending parallel with said turret axis and nomal to a diametrical plane extending through the axis of rotation of said turret, means for intermittently rotating the turret to bring the mold members successively to a loading station, a compacting and shaping station, and a discharge station, means at the loading station for delivering a group of the product portions in row formation and into alignment with a row of the mold cavities for transfer into said cavities, means for feeding said group of product portions into the cavities in a mold member, shaping punches mounted in row forming relation at the compacting station on opposite sides of the mold member for horizontal reciprocating movement, means to reciprocate the shaping punches to bring the free ends of the punches on one side of the mold flush with the ends of the cavities in the mold member and to engage the free ends of the punches on the opposite side of the mold member with the ends of product portions in the mold cavities so as to compress the product portions in each of the mold cavities and to compact and shape the same.

23. In an apparatus as recited in claim 22, and a sleeve associated with the shaping punches on the one side of the mold member which sleeve is mounted for horizontal reciprocating movement with said shaping punches so as to bring it in one position thereof alongside the mold member for receiving the ends of said product portions and forming an extension of the cavities in the mold member.

References Cited by the Examiner

UNITED STATES PATENTS

| | | | |
|---|---|---|---|
| 994,714 | 6/1911 | Boyle | 17—32 |
| 2,228,998 | 1/1941 | Birdseye | 62—381 |
| 2,397,446 | 3/1946 | Tansley | 17—32 |
| 2,683,284 | 7/1954 | Anderson | 17—32 |
| 2,897,745 | 8/1959 | Nichols et al. | |
| 3,005,716 | 10/1961 | Moreland | 99—109 |
| 3,091,798 | 6/1963 | Vedvik et al. | 17—32 |
| 3,132,950 | 5/1964 | Macy et al. | 99—109 |

SAMUEL KOREN, *Primary Examiner.*

LUCIE H. LAUDENSLAGER, *Examiner.*